(12) United States Patent
Kaburaki et al.

(10) Patent No.: US 10,824,570 B2
(45) Date of Patent: Nov. 3, 2020

(54) MEMORY SYSTEM

(71) Applicant: Toshiba Memory Corporation, Minato-ku (JP)

(72) Inventors: Satoshi Kaburaki, Meguro (JP); Tetsuhiko Azuma, Shinagawa (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 16/562,730

(22) Filed: Sep. 6, 2019

(65) Prior Publication Data

US 2020/0226069 A1    Jul. 16, 2020

(30) Foreign Application Priority Data

Jan. 16, 2019  (JP) .................. 2019-005270

(51) Int. Cl.
*G06F 12/00* (2006.01)
*G06F 12/10* (2016.01)
(Continued)

(52) U.S. Cl.
CPC ............ *G06F 12/10* (2013.01); *G06F 3/0604* (2013.01); *G06F 3/0659* (2013.01);
(Continued)

(58) Field of Classification Search
CPC .. G06F 12/10; G06F 12/1009; G06F 12/1027; G06F 12/1475; G06F 12/0238; G06F 12/0246; G06F 12/0292; G06F 3/0604; G06F 3/0659; G06F 3/0679; G06F 2212/657

See application file for complete search history.

(56) References Cited

U.S. PATENT DOCUMENTS 8,819,375 B1 * 8/2014  Pruett ..................... G06F 13/28
                                                        711/165
9,047,177 B2   6/2015  Matsudaira et al.
(Continued)

FOREIGN PATENT DOCUMENTS

JP   2011-018182 A   1/2011
JP   2013-196115 A   9/2013

*Primary Examiner* — Shawn X Gu

(74) *Attorney, Agent, or Firm* — Oblon, McClelland, Maier & Neustadt, L.L.P.

(57) ABSTRACT

A first memory stores a translation table indicating a first correspondence between a logical address and a physical address at first timing. A second memory stores a difference table that is configured to record, in each of entries, a correspondence between a logical address range and a physical address range, the correspondence representing a difference between the first correspondence and a second correspondence. The second correspondence is between the logical address and the physical address at second timing. In non-volatilizing data in a first logical address range to a first physical address range, in a case where the entries includes a first entry containing a correspondence between a second logical address range and a second physical address range, the controller updates the first entry. The first logical address range follows the second logical address range, and the first physical address range follows the second physical address range.

12 Claims, 19 Drawing Sheets

(51) Int. Cl.
  *G06F 3/06* (2006.01)
  *G06F 12/02* (2006.01)
(52) U.S. Cl.
  CPC ........ *G06F 3/0679* (2013.01); *G06F 12/0238* (2013.01); *G06F 2212/657* (2013.01)

(56) References Cited

U.S. PATENT DOCUMENTS

2010/0241819 A1* 9/2010 Yoshii ................. G06F 12/0246
  711/170
2012/0089811 A1 4/2012 Sawai \* cited by examiner

MEMORY SYSTEM

CROSS-REFERENCE TO RELATED APPLICATIONS

This application is based upon and claims the benefit of priority from Japanese Patent Application No. 2019-005270, filed on Jan. 16, 2019; the entire contents of which are incorporated herein by reference.

FIELD

Embodiments described herein relate generally to a memory system.

BACKGROUND

Conventionally, memory systems such as a solid state drive (SSD) employ a logical address-physical address translation table listing a correspondence between a logical address and a physical address. The logical address refers to address information used by a host to designate an access destination. The physical address refers to address information indicating an actual physical location of stored data.

The logical address-physical address translation table is stored in nonvolatile memory such as NAND flash memory. However, accessing the logical address-physical address translation table in response to each data write request from the host is unfavorable in terms of processing speed or write amplification factor (WAF).

In view of this, a correspondence between updated logical address and physical address by a latest write operation may be stored in volatile memory as a difference table containing differences from the logical address-physical address translation table. A method of storing such a difference table may be adoptable.

DETAILED DESCRIPTION

According to the present embodiment, in general, a memory system includes a first memory, a second memory, and a controller. The first memory is nonvolatile and configured to store a logical address-physical address translation table. The logical address-physical address translation table indicates a first correspondence. The first correspondence is a correspondence between a logical address and a physical address at first timing, the logical address being location information designated by a host, the physical address being information of a location in the first memory. The second memory is configured to store a difference table. The difference table includes a plurality of entries and is configured to record, in each of the entries, a correspondence between a logical address range and a physical address range, the correspondence representing a difference between the first correspondence and a second correspondence. The second correspondence is a correspondence between the logical address and the physical address at second timing later than the first timing. The controller is configured to non-volatilize write data requested by a write command from the host, and updates the difference table in response to non-volatilization of the write data. The controller is further configured to, in non-volatilizing first write data in a first logical address range to a first physical address range, in a case where the entries includes a first entry, update contents of a first entry. The first entry is an entry containing a correspondence between a second logical address range and a second physical address range. The first logical address range follows the second logical address range, and the first physical address range follows the second physical address range. The controller is configured to, in a case where the entries include no first entry, record, in a second entry, a correspondence between the first logical address range and the first physical address range. The second entry is an entry in which a new correspondence is recordable.

Exemplary embodiments of a memory system will be explained below in detail with reference to the accompanying drawings. The present invention is not limited to the following embodiments.

First Embodiment

Figure 1:
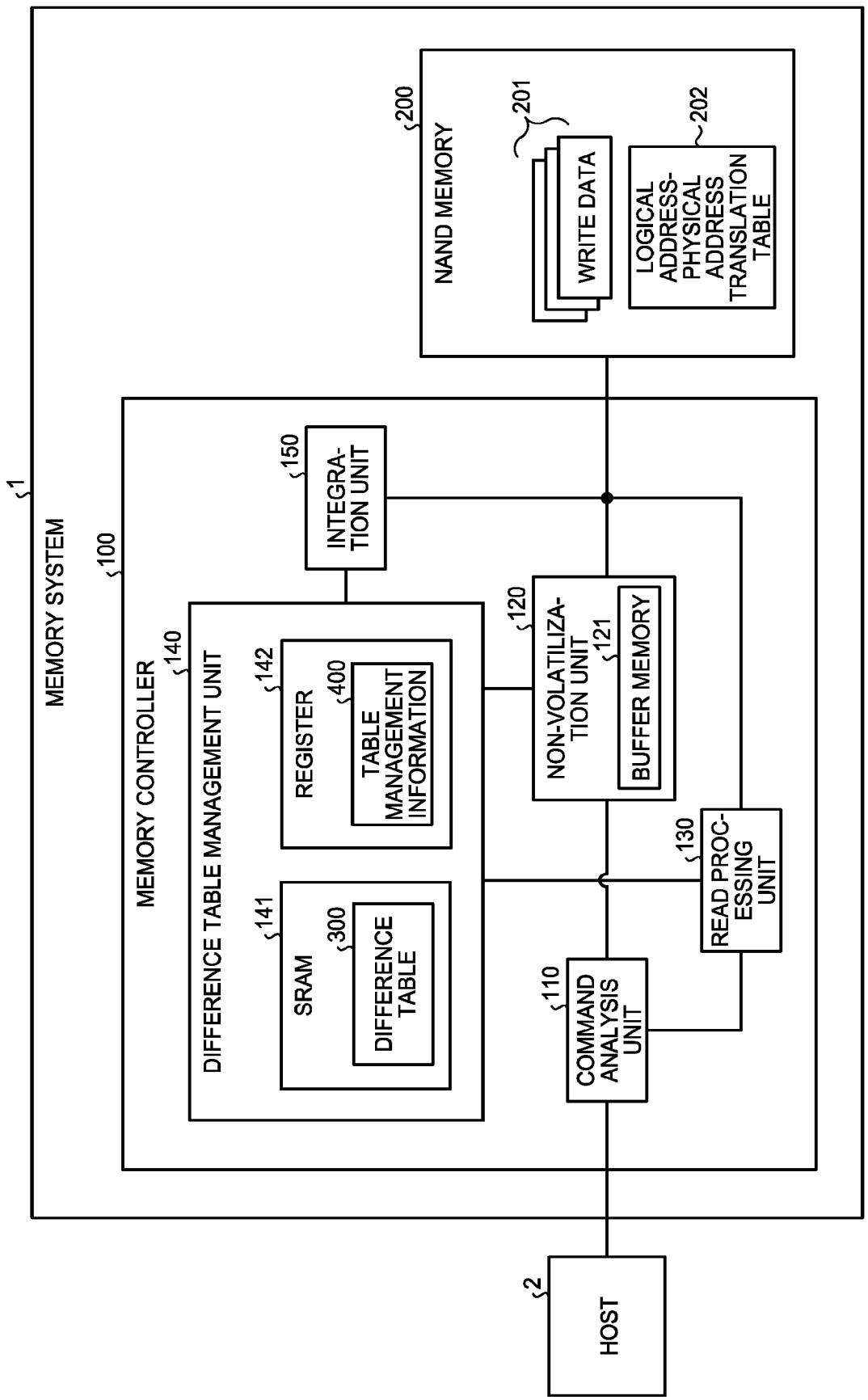
FIG. 1 is a schematic and illustrative diagram of the configuration of a memory system of a first embodiment.

FIG. 1 is a schematic and illustrative diagram of the configuration of a memory system of a first embodiment.

A memory system 1 is connected to a host 2. Any connection standard can be adopted. The host 2 represents, for example, a personal computer, a mobile information terminal, or a server.

The memory system 1 can receive access commands, i.e., a read command and a write command, from the host 2. Each access command includes a logical address designating an access destination. The logical address is location information provided by the memory system 1 to the host 2. The location information indicates a location in a logical address space. The memory system 1 receives write target data together with a write command. Write target data received from the host 2 will be referred to as write data below.

The memory system 1 includes a NAND flash memory (NAND memory) 200 and a memory controller 100 that transfers data between the host 2 and the NAND memory 200.

The NAND memory 200 is a nonvolatile memory and is an exemplary first memory. The first memory can be any type of nonvolatile memory.

The NAND memory 200 includes a memory cell array having a plurality of blocks. Data stored in each block is erased at a time. Each block includes a plurality of pages. Data is written to and read from the memory cell array on a page basis.

Figure 2:
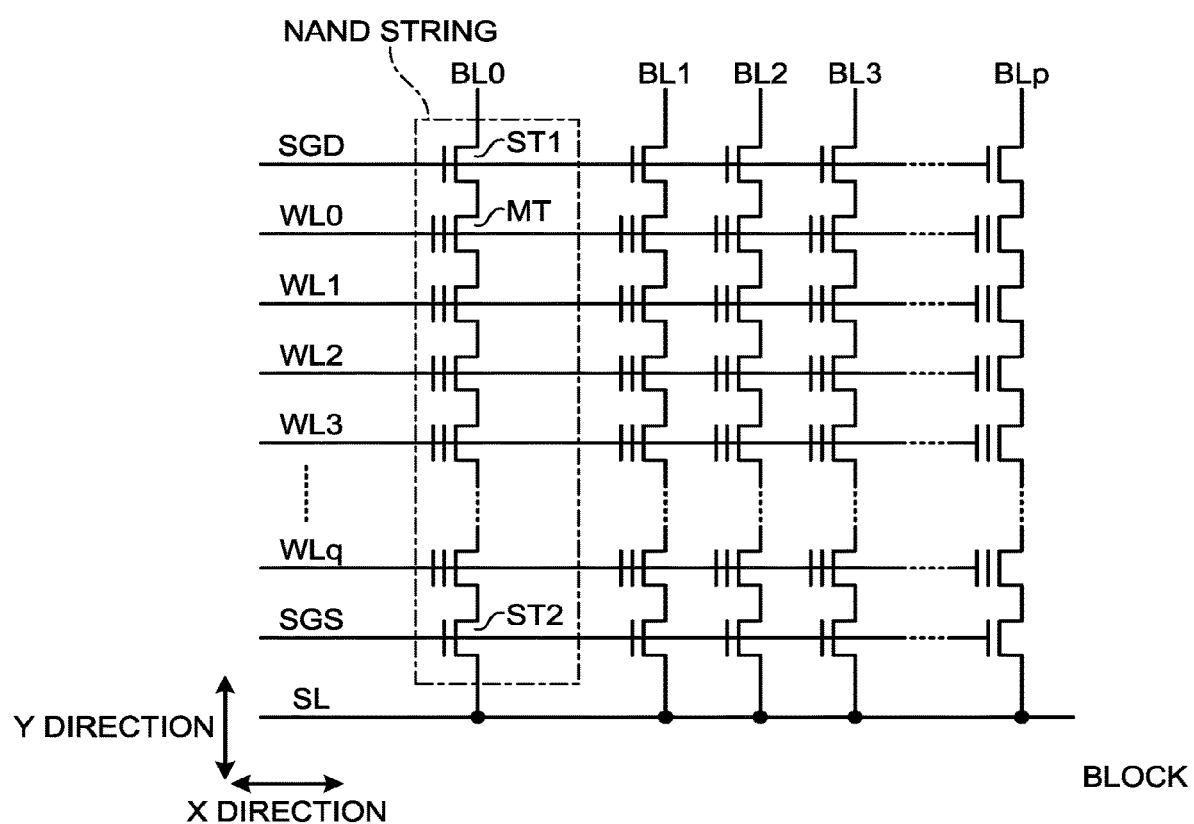
FIG. 2 is a schematic and illustrative circuit diagram of the configuration of one block in the first embodiment.

FIG. 2 is a schematic and illustrative circuit diagram of the configuration of one block in the first embodiment. As illustrated, each block includes (p+1) NAND strings arranged sequentially in an X direction (p≥0). Select transistors ST1 of the (p+1) NAND strings are connected at drains to bit lines BL0 to BLp and are connected at gates in common to a select gate line SGD. Select transistors ST2 are connected at sources in common to a source line SL, and are connected at gates in common to a select gate line SGS.

Each memory cell MT includes a metal oxide semiconductor field effect transistor (MOSFET) having a gate stack structure formed on a semiconductor substrate. The gate stack structure includes a floating gate formed on the semiconductor substrate via a tunnel oxide film, and a control gate electrode formed on the floating gate via an inter-gate insulating film. A threshold voltage of a memory cell MT varies depending on the number of electrons accumulated in the floating gate. The memory cell MT stores data in accordance with a difference in the threshold voltage. In other words, the memory cell MT holds an amount of charges corresponding to data in the floating gate.

In each NAND string, (q+1) memory cells MT are placed between the source of the select transistor ST1 and the drain of the select transistor ST2 so as to connect their current paths in series. Control gate electrodes are connected to word lines WL0 to WLq, respectively, in sequence from the memory cell MT located closest to the drain. That is, the drain of the memory cell MT connected to the word line WL0 is connected to the source of the select transistor ST1. The source of the memory cell MT connected to the word line WLq is connected to the drain of the select transistor ST2.

The word lines WL0 to WLq connect control gate electrodes of the memory cells MT in common across the NAND strings in the block. In other words, the control gate electrodes of the memory cells MT in the same row of the block are connected to the same word line WL. In the case of each memory cell MT retainable of one bit value, (p+1) memory cells MT connected to the same word line WL are handled as one page. A program operation and a read operation are performed in unit of page.

Each memory cell MT can store multiple-bit data. For example, in the case of each memory cell MT storable of data of n (n≥2) bits, the storage capacity per word line equals to a size of n pages.

The configuration of the block is not limited to this example. The memory cells MT may be arranged two-dimensionally or three-dimensionally. To three-dimensionally arrange the memory cells MT, for example, a multilayer element of alternately laminated conductive films and insulating films may be penetrated by columnar semiconductor columns, to place the memory cells MT at intersections between the conductive films and the semiconductor columns.

Referring back to FIG. 1, the NAND memory 200 stores write data 201 and a logical address-physical address translation table 202.

The memory controller 100 performs a given operation to the write data 201 and then stores it in the NAND memory 200. The given operation can include error-correction coding or randomization, for example.

The logical address-physical address translation table 202 includes information on a correspondence between a logical address and a physical address. The physical address is location information on a physical location in the NAND memory 200.

The memory controller 100 transfers data between the host 2 and the NAND memory 200. The memory controller 100 is an exemplary controller.

The memory controller 100 includes a command analysis unit 110, a non-volatilization unit 120, a read processing unit 130, a difference table management unit 140, and an integration unit 150.

The command analysis unit 110 determines the type of command received from the host 2. Upon receipt of a write command from the host 2, the command analysis unit 110 transmits, to the non-volatilization unit 120, a logical address included in the write command together with write data requested by the write command. Upon receipt of a read command from the host 2, the command analysis unit 110 transmits, to the read processing unit 130, a logical address included in the read command.

In response to receipt of the logical address included in the read command from the command analysis unit 110, the read processing unit 130 converts the logical address to a physical address by an address resolution. The read processing unit 130 then reads data i.e., the write data 201 from a location indicated by the physical address found by the conversion, and transmits the read data to the host 2.

The non-volatilization unit 120 includes a buffer memory 121. The buffer memory 121 is an exemplary third memory.

The third memory is not limited to a specific type. The third memory can be a volatile memory faster and more excellent in terms of random accessibility than the NAND memory 200. Specifically, examples of the third memory include a dynamic random access memory (DRAM) or static random access memory (SRAM).

In response to receipt of the logical address and the write data, the non-volatilization unit 120 stores the write data in the buffer memory 121. The non-volatilization unit 120 then non-volatilizes the write data stored in the buffer memory 121 to store the write data in the NAND memory 200.

The buffer memory 121 can receive and accumulate one or more items of write data together with different write commands. The non-volatilization unit 120 can store, in the NAND memory 200, the one or more items of write data stored in the buffer memory 121 through one non-volatilization. Through the non-volatilization, the non-volatilization unit 120 can store only part of one item of write data stored in the buffer memory 121, in the NAND memory 200, and store another part of the same write data in the NAND memory 200 by subsequent non-volatilization.

A trigger condition for executing non-volatilization can be freely set. An exemplary trigger condition can be such that the total amount of write data stored in the buffer memory 121 exceeds a given amount. The given amount refers to, for example, one-page capacity. The non-volatilization unit 120 can write, for example, a given amount of write data to the NAND memory 200.

In executing the non-volatilization, the non-volatilization unit 120 generates a notification indicating a correspondence between a range of write data located in a logical address space and a range of the write data stored in the NAND memory 200, that is, a physical address space, for each item of write data as a subject of the non-volatilization. This notification is for notifying an update of the correspondence between the logical address and the physical address. This notification is referred to below as an update notification. The non-volatilization unit 120 transmits the generated update notification to the difference table management unit 140.

Hereinafter, the range in the logical address space will be referred to as a logical address range. The range in the physical address space will be referred to as a physical address range.

The difference table management unit 140 includes an SRAM 141 and a register 142. The SRAM 141 is an exemplary second memory. The SRAM 141A includes a difference table 300 in which a difference from the logical address-physical address translation table 202 can be recorded. The difference refers, specifically, to a difference in correspondence between the latest logical address and physical address and the ones shown by the logical address-physical address translation table 202. In other words, the logical address-physical address translation table 202 lists a correspondence between a logical address and a physical address at given timing (first timing). The difference table 300 contains a difference between the correspondence indicated by the logical address-physical address translation table 202 and a correspondence between a logical address and a physical address at timing later than the first timing (second timing). The register 142 stores table management information 400.

The difference table management unit 140 manages the difference table 300.

The integration unit 150 can execute an integration operation to integrate information recorded in the difference table 300 in the logical address-physical address translation table 202.

Figure 3:
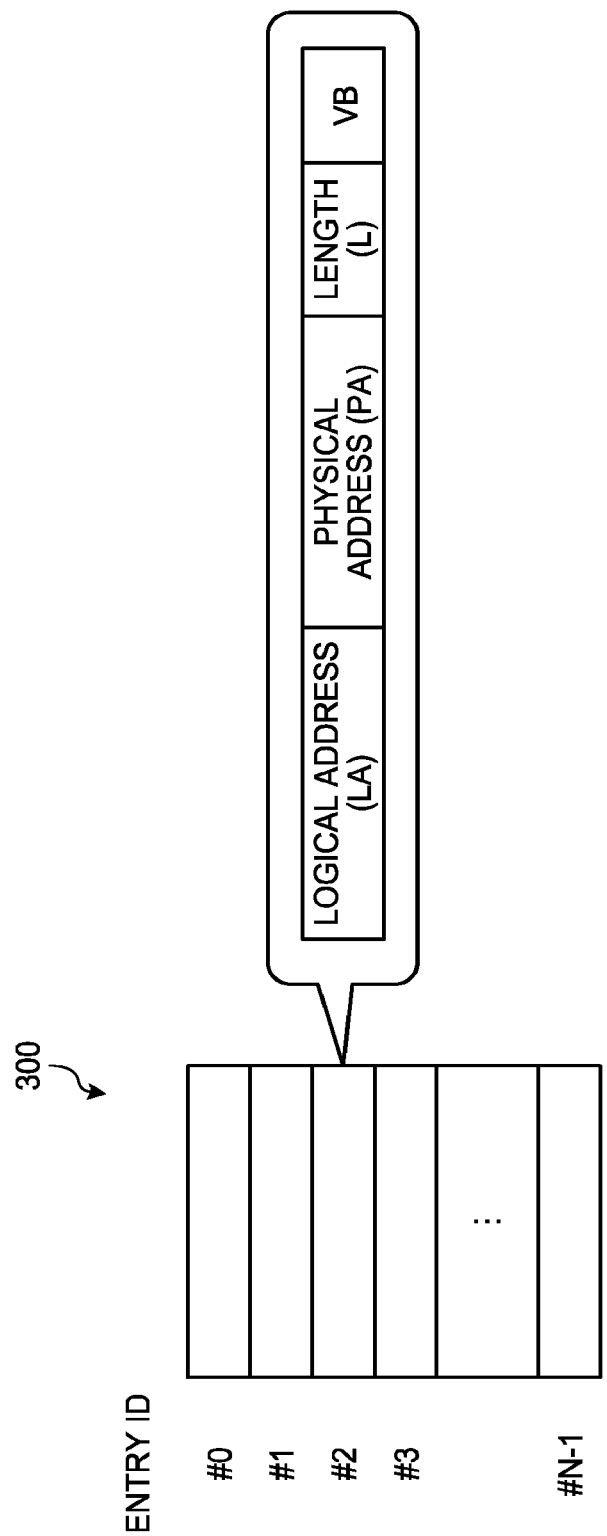
FIG. 3 is a schematic and illustrative diagram for explaining a data configuration of a difference table in the first embodiment.

FIG. 3 is a schematic and illustrative diagram for explaining a data configuration of the difference table 300 in the first embodiment. As illustrated in FIG. 3, the difference table 300 includes N entries where N is an integer equal to or greater than two. An entry ID is assigned to each of the N entries. The difference table 300 may or may not be configured as a ring buffer.

In each of the N entries of the difference table 300, the correspondence between consecutive logical addresses and consecutive physical addresses linearly corresponding to the consecutive logical addresses is recordable. In other words, a correspondence between a logical address range and a physical address range can be recorded in each of the N entries of the difference table 300.

For example, as illustrated in FIG. 3, each entry of the difference table 300 includes a field where a logical address LA is recorded, a field where a physical address PA is recorded, and a field where a length L is recorded.

Figure 4:
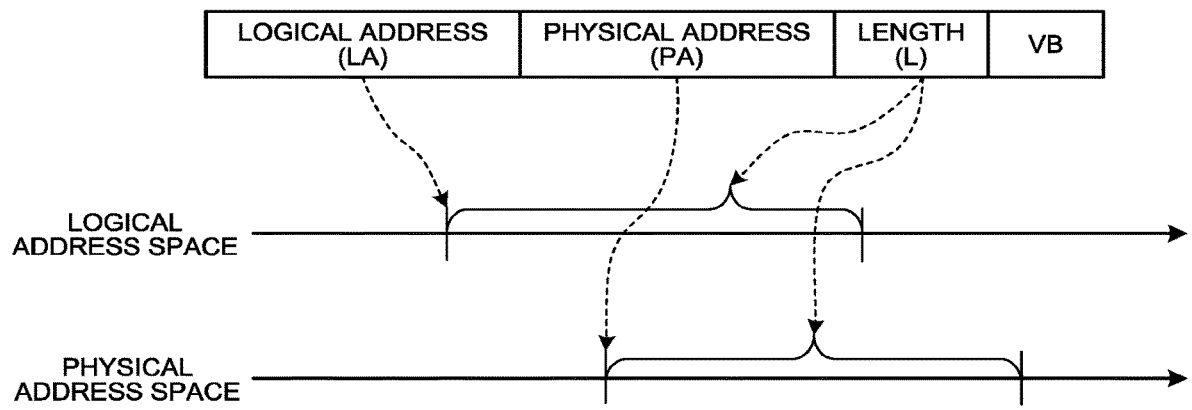
FIG. 4 is a schematic and illustrative diagram for explaining contents in one entry of the difference table in the first embodiment.

FIG. 4 is a schematic and illustrative diagram for explaining contents of one entry of the difference table 300 in the first embodiment. The logical address LA indicates a starting point of a logical address range. The physical address PA indicates a starting point of a physical address range corresponding to the logical address range. The length L indicates the width of the logical address range or physical address range.

As configured above, the contents of each entry can linearly associate a range from the logical address LA to a logical address (LA+L−1) with a range from the physical address PA to a physical address (PA+L−1).

The length L is exemplary length information on the length (width) of the logical address range or physical address range. The length information is not limited to this example. Instead of the length L, for example, the length information can be an address of an end point of each address range.

Each entry of the difference table 300 can include a field where a valid bit VB is recorded. The valid bit VB indicates whether an entry including a valid bit VB is valid or invalid.

For example, when a new correspondence is recorded in an entry, a valid value is recorded as a valid bit VB of the entry. The entry is regarded as a valid entry.

For another example, when a correspondence recorded in an entry is integrated in the logical address-physical address translation table 202, an invalid value is recorded as the valid bit VB of the entry. The entry is regarded as an invalid entry. Contents of the invalid entry are not used in any operation. The invalid entry is regarded as a free entry available for recording of a new correspondence.

The above has described an exemplary changing method of the valid bit VB. The changing method of the valid bit VB is not limited to this example.

In the non-volatilization process, a correspondence between a logical address range of write data and a physical address range of a storage destination of the write data is recorded in the difference table 300, on the basis of an update notification from the non-volatilization unit 120. In other words, the correspondence between the logical address and the physical address is partially changed through the non-volatilization. The difference table 300 is to contain information on a difference between a correspondence between a logical address and a physical address indicated by the logical address-physical address translation table 202 and the latest correspondence between a logical address and a physical address changed by the non-volatilization.

At the time of processing a read command, an address resolution operation for converting a logical address included in the read command to a physical address corresponding to the logical address is executed. In the address resolution operation, the difference table 300 is searched before the logical address-physical address translation table 202. If the difference table 300 contains a correspondence related to a logical address being a subject of conversion, the correspondence is used for conversion. If the difference table 300 contains no correspondence related to the logical address being a subject of conversion, the logical address-physical address translation table 202 stored in the NAND memory 200 is used for conversion.

The number of entries of the difference table 300 is finite. Thus, continuous non-volatilization results in using up free entries. Without free entries, the non-volatilization is not executable. Hence, the non-volatilization is interrupted by the integration operation.

In the integration operation, correspondences recorded in the difference table 300 are partially or entirely integrated in the logical address-physical address translation table 202. An entry containing the correspondence subjected to the integration operation is transitioned from a valid state to an invalid state through change of the valid bit VB. Consequently, the entry is regarded as a free entry, i.e., in a ready state for recording of a new correspondence. A free entry is generated by the integration operation, which allows the non-volatilization to resume.

Thus, with no free entries, the non-volatilization is interrupted to execute the integration operation. The non-volatilization stands by until completion of the integration operation. That is, frequent occurrence of no free entries will end up with lowering write performance.

In the first embodiment, in response to receipt of a new update notification, the difference table management unit 140 does not record contents indicated by the update notification in a free entry but updates contents of a non-free entry upon satisfaction of a specific condition. This can lower the frequency of occurrence of no free entries, and prevent degradation of write performance.

FIGS. 5A and 5B and 6A and 6B are schematic and illustrative diagrams for explaining an outline of the operation of the difference table management unit 140 in the first embodiment.

Figure 5A:
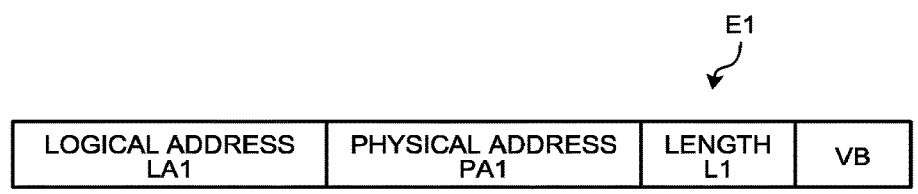
FIGS. 5A and 5B are schematic and illustrative diagrams for explaining an outline of the operation of a difference table management unit in the first embodiment.
Figure 5B:
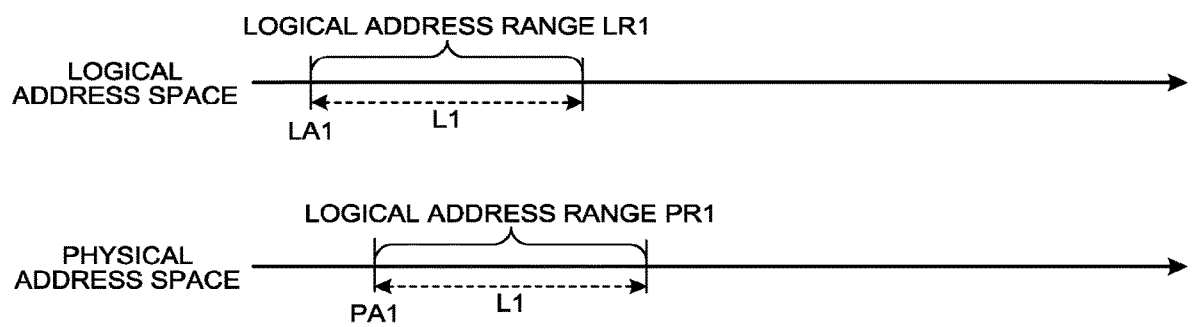

As illustrated in FIG. 5A, for example, a logical address LA1, a physical address PA1, and a length L1 are recorded in a valid entry (referred to as a first entry E) of the difference table 300. Contents of the entry E indicate a correspondence between a logical address range LR1 with the length L1 starting from the logical address LA1, and a physical address range PR1 with the length L1 starting from the physical address PA1, as illustrated in FIG. 5B.

Figure 6A:
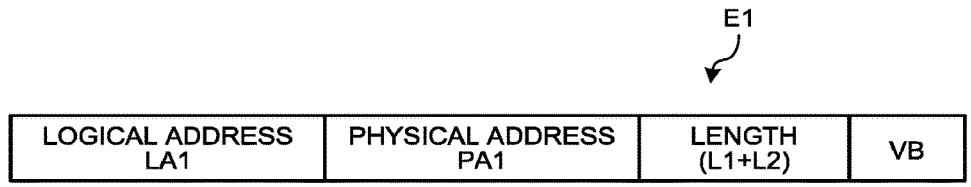
FIGS. 6A and 6B are schematic and illustrative diagrams for explaining the outline of the operation of the difference table management unit in the first embodiment.

In the situation that the entry E1 contains such a correspondence, upon receipt of an update notification indicating a correspondence between a logical address range LR2 following the logical address range LR1 and a physical address range PR2 following the physical address range PR1, the difference table management unit 140 updates the length L1 recorded in the first entry E1 to a sum of the length L1 and a length L2 of the logical address range LR2 or the physical address range PR2, as illustrated in FIG. 6A.

Figure 6B:
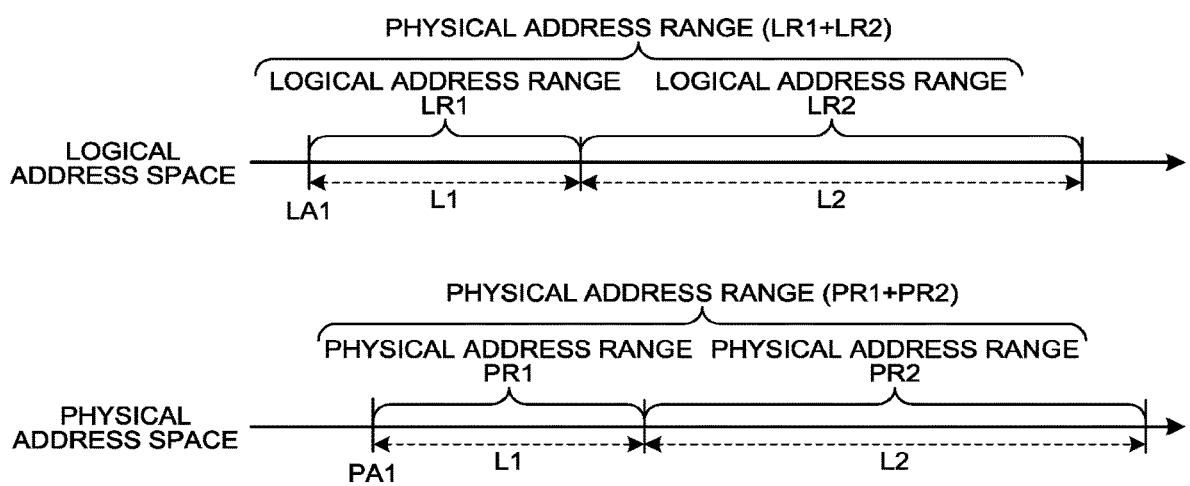

Consequently, the updated entry E1 contains a correspondence between a combined range (LR1+LR2) of the logical address ranges LR1 and LR2 and a combined range (PR1+PR2) of the physical address ranges PR1 and PR2, as illustrated in FIG. 6B.

According to the first embodiment, thus, upon satisfaction of a condition that the ranges of written data indicated by an update notification follows both of the logical address range and the physical address range whose correspondence has been recorded in the difference table 300, a correspondence indicated by the update notification is recorded not in a free entry but in an existing entry of the difference table 300 to update its contents. The existing entry is, in other words, a valid entry where a correspondence has been recorded.

Satisfaction of the condition that the ranges indicated by an update notification follows both of the logical address range and the physical address range whose correspondence has been recorded in the difference table 300 is referred to below as continuity of a notified correspondence. Non-satisfaction of this condition is referred to as non-continuity of a notified correspondence.

The non-volatilization unit 120 can select a free block not associated with any logical address, as an input block, and write data to the input block in order of physical address. Thus, in non-volatilizing two items of write data consecutively, for example, the two items of write data are stored in two consecutive physical address ranges. In other words, two items of inconsecutively non-volatilized write data are stored in two inconsecutive physical address ranges. This signifies that continuity or non-continuity of a notified correspondence can be determined on the basis of only a previously updated entry in the difference table 300.

Hence, the difference table management unit 140 stores the previously updated entry and determines continuity on the basis of the stored entry. Specifically, the difference table management unit 140 stores the table management information 400 on the previously updated entry, in the register 142. The difference table management unit 140 then determines whether or not the notified correspondence has continuity on the basis of the notified correspondence and the table management information 400.

Figure 7:
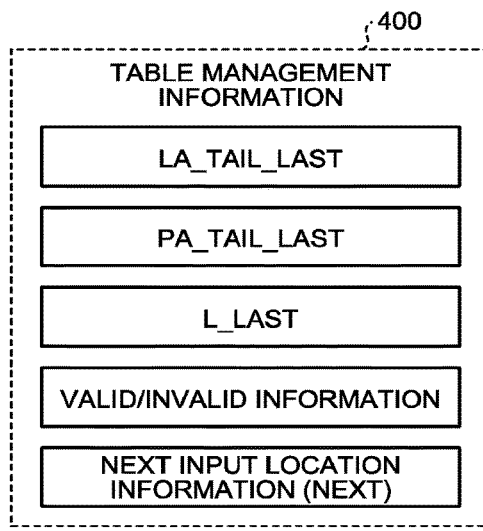
FIG. 7 is a schematic and illustrative diagram of the configuration of table management information in the first embodiment.

FIG. 7 is a schematic and illustrative diagram of the configuration of the table management information 400 in the first embodiment. The table management information 400 includes a logical address LA_TAIL_LAST, a physical address RA_TAIL_LAST, a length L_LAST, valid or invalid information, and next input location information NEXT.

LA_TAIL_LAST represents exemplary tail end information on the tail end of a logical address range indicated by the previously updated entry. Specifically, LA_TAIL_LAST represents, for example, a value found by adding the length L to the logical address LA recorded in the previously updated entry. That is, in this example, LA_TAIL_LAST indicates a logical address following a logical address range related to a correspondence recorded in the previously updated entry.

PA_TAIL_LAST represents exemplary tail end information on the tail end of a physical address range indicated by the previously updated entry. Specifically, PA_TAIL_LAST represents, for example, a value found by adding the length L to the physical address PA recorded in the previously updated entry. In other words, in this example, PA_TAIL_LAST represents a physical address following a physical address range related to a correspondence recorded in the previously updated entry.

L_LAST represents the length L recorded in the previously updated entry.

In response to receipt of an update notification, the difference table management unit 140 determines whether or not a logical address (denoted by LA_HEAD_NEW) included in the update notification coincides with LA_TAIL_ LAST and whether a physical address (denoted by PA_HEAD_NEW) included in the update notification coincides with PA_TAIL_LAST. When LA_HEAD_NEW coincides with LA_TAIL_LAST and PA_HEAD_NEW coincides with PA_TAIL_LAST, the difference table management unit 140 can determine that the notified correspondence has continuity. When LA_HEAD_NEW does not coincide with LA_TAIL_LAST or when PA_HEAD_NEW does not coincide with PA_TAIL_LAST, the difference table management unit 140 can determine that the notified correspondence has no continuity.

NEXT represents a free entry in which a correspondence can be recorded next.

The valid/invalid information indicates whether contents of the table management information 400 are valid or invalid. An initial value of the valid/invalid information is set to a value indicating invalid. In response to update of an entry of the difference table 300, the valid/invalid information of the entry is set to a value indicating valid. A setting method of the valid/invalid information is not limited to this example. The value of the valid/invalid information is set to valid or invalid by any trigger.

Part or all of the command analysis unit 110, the non-volatilization unit 120, the read processing unit 130, and the difference table management unit 140 can include hardware circuitry such as a field-programmable gate array (FPGA) or an application specific integrated circuit (ASIC). Part or all of the functions of the command analysis unit 110, the non-volatilization unit 120, the read processing unit 130, the difference table management unit 140, and the integration unit 150 may be implemented by one or more processors' executing a program. The memory controller 100 can be configured as, for example, a system-on-a-chip (SoC). The memory controller 100 may be formed of a plurality of chips.

The SRAM 141, the register 142, or both of them may be located outside the difference table management unit 140. The SRAM 141, the register 142, or both of them may be located outside the memory controller 100. The buffer memory 121 may be located outside the non-volatilization unit 120. The buffer memory 121 may be located outside the memory controller 100. The read processing unit 130 can include a buffer memory. The buffer memory 121 and the buffer memory of the read processing unit 130 can be the same.

Next, the operation of the memory system 1 in the first embodiment is described.

Figure 8:
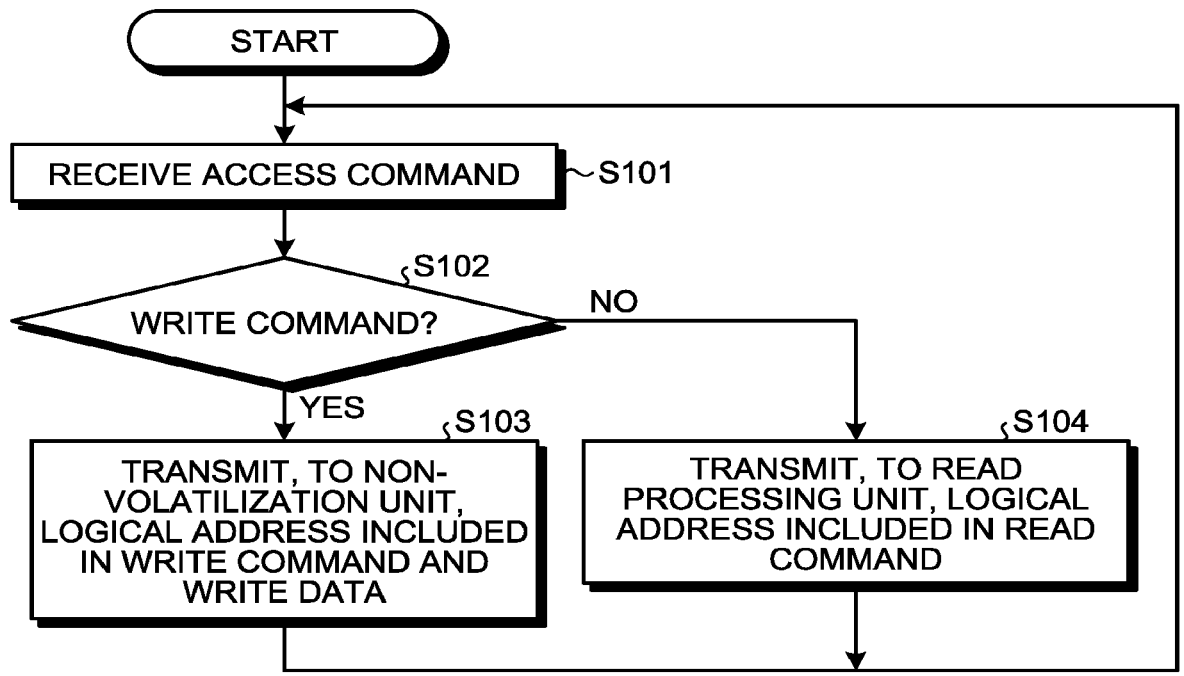
FIG. 8 is a schematic and illustrative flowchart of the operation of a command analysis unit in the first embodiment.

FIG. 8 is a schematic and illustrative flowchart of the operation of the command analysis unit 110 in the first embodiment. In response to receipt of an access command from the host 2 (S101), the command analysis unit 110 determines whether or not the access command is a write command, through analysis (S102). After determining that the access command is a write command (Yes in S102), the command analysis unit 110 transmits, to the non-volatilization unit 120, a logical address included in the write command and write data requested by the write command (S103). The control then returns to S101.

After determining that the command received from the host 2 is not a write command but a read command (No in S102), the command analysis unit 110 transmits a logical address included in the read command to the read processing unit 130 (S104). The control then returns to S101.

Figure 9:
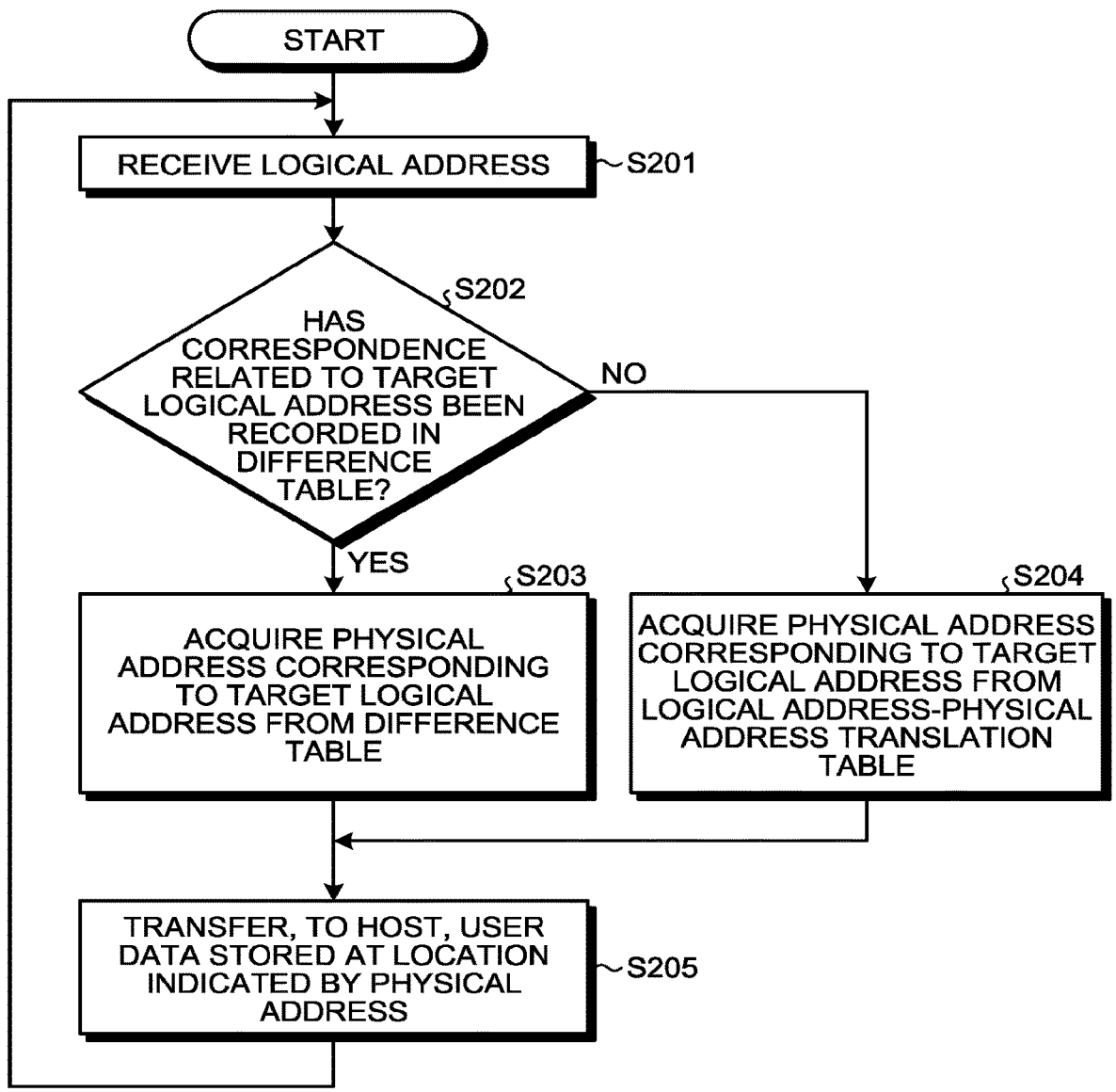
FIG. 9 is a schematic and illustrative flowchart of the operation of a read processing unit in the first embodiment.

FIG. 9 is a schematic and illustrative flowchart of the operation of the read processing unit 130 in the first embodiment. Firstly, the read processing unit 130 receives a logical address from the command analysis unit 110 (S201). The logical address is the one transmitted by the command analysis unit 110 in S104. In the example of FIG. 9, this logical address is referred to as target logical address.

After S201, the read processing unit 130 searches the difference table 300 to determine whether or not the difference table 300 contains a correspondence related to the target logical address (S202). If the difference table 300 contains the correspondence related to the target logical address (Yes in S202), the read processing unit 130 acquires a physical address corresponding to the target logical address from the correspondence in the difference table 300 (S203).

If the difference table 300 contains no correspondence related to the target logical address (No in S202), the read processing unit 130 acquires a physical address corresponding to the target logical address, referring to the logical address-physical address translation table 202 stored in the NAND memory 200 (S204).

The memory controller 100 may include a cache memory in which part or the whole of the logical address-physical address translation table 202 is cached. In the case of the cache memory storing a correspondence related to the target logical address, the read processing unit 130 may acquire a physical address corresponding to the target logical address from the correspondence in the cache memory.

After S203 or S204, the read processing unit 130 reads user data from a location in the NAND memory 200 designated by the acquired physical address, and transfers the user data to the host 2 (S205). The control then returns to S201.

Figure 10:
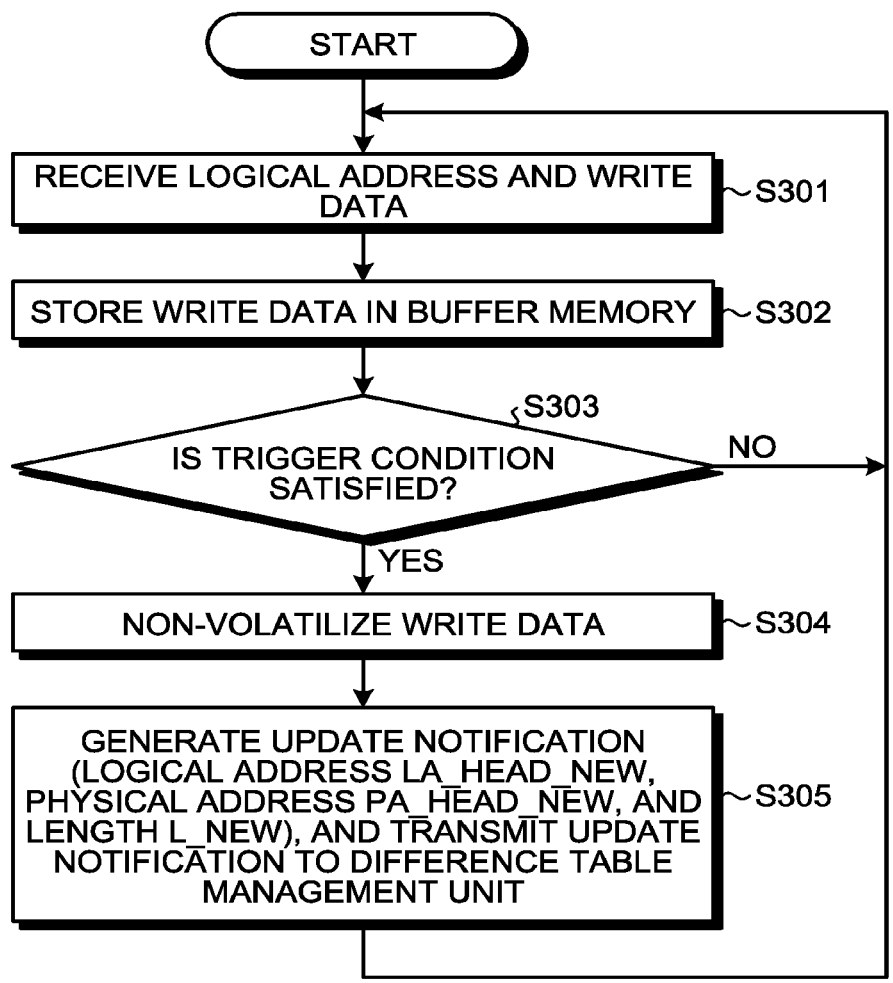
FIG. 10 is a schematic and illustrative flowchart of the operation of a non-volatilization unit in the first embodiment.

FIG. 10 is a schematic and illustrative flowchart of the operation of the non-volatilization unit 120 in the first embodiment. The non-volatilization unit 120 receives a logical address and writes data from the command analysis unit 110 (S301). The logical address and the write data have been transmitted by the command analysis unit 110 in S103.

The non-volatilization unit 120 stores the received write data in the buffer memory 121 (S302). Upon satisfaction of the trigger condition for executing the non-volatilization (Yes in S303), the non-volatilization unit 120 non-volatilizes the write data in the buffer memory 121 (S304). In other words, the non-volatilization unit 120 writes the write data in the buffer memory 121 to the NAND memory 200.

In S304, the non-volatilization unit 120 writes the write data to a head position of a free space in an input block. Thereby, the write data is written to a location following a physical address range of previously written data. With no free space available in the input block, the non-volatilization unit 120 can stop writing new data to the input block, and prepare a new input block to resume writing the write data to the new input block.

Next, the non-volatilization unit 120 generates an update notification for the non-volatilized write data, and transmits the update notification to the difference table management unit 140 (S305). The control then returns to S301.

The update notification includes the logical address LA_HEAD_NEW being a starting point of a logical address range of the write data, the physical address PA_HEAD_ NEW being a starting point of a physical address range of the written data, and a length L_NEW. The logical address LA_HEAD_NEW corresponds to the logical address included in the write command. The length L_NEW corresponds to the size of the write data.

In S304, the non-volatilization unit 120 can write, to the NAND memory 200, two or more items of write data requested by different write commands. In this case, the non-volatilization unit 120 generates and transmits an update notification for each item of write data requested by each write command in S305.

The write data may be written across two input blocks. In writing the write data to two input blocks with inconsecutive physical addresses, the non-volatilization unit 120 may separately generate and transmit update notifications for part of the write data written to one of the two input blocks and the rest of the write data written to the other input block.

Figure 11:
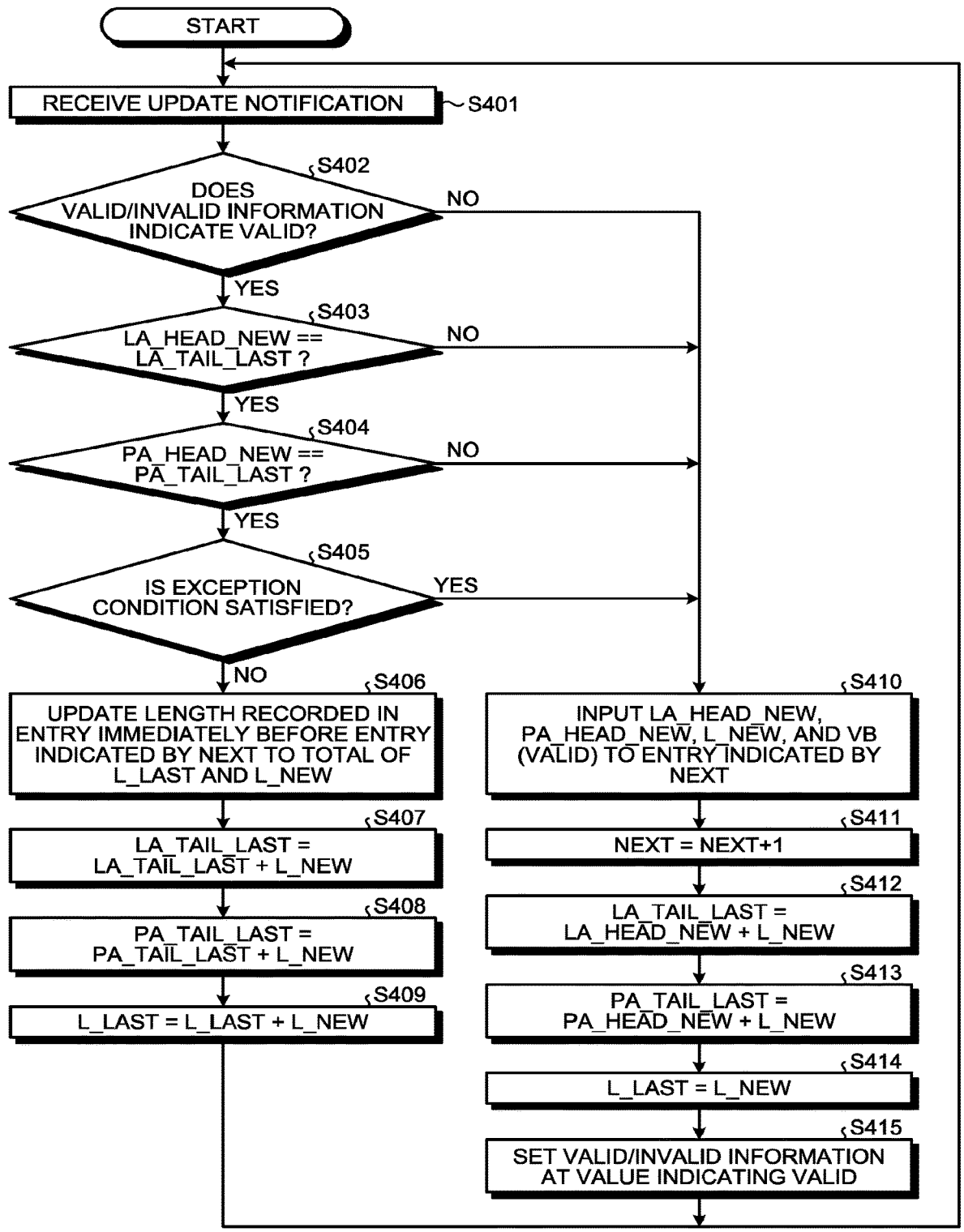
FIG. 11 is a schematic and illustrative flowchart of the operation of a difference table management unit for recording in the difference table in the first embodiment.

FIG. 11 is a schematic and illustrative flowchart of the recording operation to the difference table 300 by the difference table management unit 140 in the first embodiment. In response to receipt of an update notification (S401), the difference table management unit 140 determines whether or not the valid/invalid information included in the table management information 400 indicates valid (S402).

After determining that the valid/invalid information indicates valid (Yes in S402), the difference table management unit 140 determines whether or not LA_HEAD_NEW matches LA_TAIL_LAST (S403). By this operation, the difference table management unit 140 determines whether or not a logical address range indicated by the update notification follows a logical address range of previously written data.

After determining that LA_HEAD_NEW matches LA_TAIL_LAST (Yes in S403), i.e., the logical address range indicated by the update notification follows the logical address range of the previously written data, the difference table management unit 140 further determines whether or not PA_HEAD_NEW matches PA_TAIL_LAST (S404). By this operation, the difference table management unit 140 determines whether or not a physical address range indicated by the update notification follows a physical address range of the previously written data.

PA_HEAD_NEW matching PA_TAIL_LAST (Yes in S404), i.e., the physical address range indicated by the update notification following the physical address range of the previously written data signifies that continuity of the notified correspondence is verified through the process S401 to S404. Hence, the difference table management unit 140 can update the previously updated entry, however, it determines whether or not an exception condition is satisfied (S405) first.

The exception condition is a condition for recording the notified correspondence having continuity in a free entry. The exception condition can be set as any condition. An exemplary exception condition will be described in a third embodiment.

Upon no satisfaction of the exception condition (No in S405), the difference table management unit 140 records the notified correspondence in an existing entry of the difference table 300 to update the entry. Specifically, the difference table management unit 140 updates a length recorded in an entry immediately before an entry indicated by the next input location information NEXT to a total of L_LAST and L_NEW (S406). Before S406, the length L_LAST matches the length recorded in the entry immediately before the entry indicated by the next input location information NEXT. The difference table management unit 140 may acquire an updated value by reading the length from the entry immediately before the entry indicated by the next input location information NEXT and adding L_NEW to the read length.

Next, the difference table management unit 140 updates the table management information 400 in accordance with the updated content of the entry immediately before the entry indicated by the next input location information NEXT. Specifically, the difference table management unit 140 updates LA_TAIL_LAST to a value found by adding L_NEW to LA_TAIL_LAST (S407), updates PA_TAIL_LAST to a value found by adding L_NEW to PA_TAIL_LAST (S408), and updates L_LAST to a value found by adding L_NEW to L_LAST (S409). By this operation, the table management information 400 is updated in accordance with the updated contents in S406.

If the valid/invalid information indicates invalid (No in S402), if LA_HEAD_NEW does not match LA_TAIL_LAST (No in S403), if PA_HEAD_NEW does not match PA_TAIL_LAST (No in S404), or if the exception condition is satisfied (Yes in S405), the difference table management unit 140 records the notified correspondence in a new entry. Specifically, the difference table management unit 140 inputs LA_HEAD_NEW, PA_HEAD_NEW, L_NEW, and VB (valid) to the entry indicated by the next input location information NEXT (S410).

The difference table management unit 140 then updates the table management information 400 in accordance with the record in the new entry. Specifically, the difference table management unit 140 updates the next input location information NEXT to a value found by adding one to NEXT (S411), updates LA_TAIL_LAST to a value found by adding L_NEW to LA_HEAD_NEW (S412), updates PA_TAIL_LAST to a value found by adding L_NEW to PA_HEAD_NEW (S413), and updates L_LAST to L_NEW (S414). The difference table management unit 140 then sets the valid/invalid information to a value indicating valid (S415). By this operation, the table management information 400 is updated in accordance with the contents in the new entry.

After S410 or S415, the control returns to S401.

Figure 12:
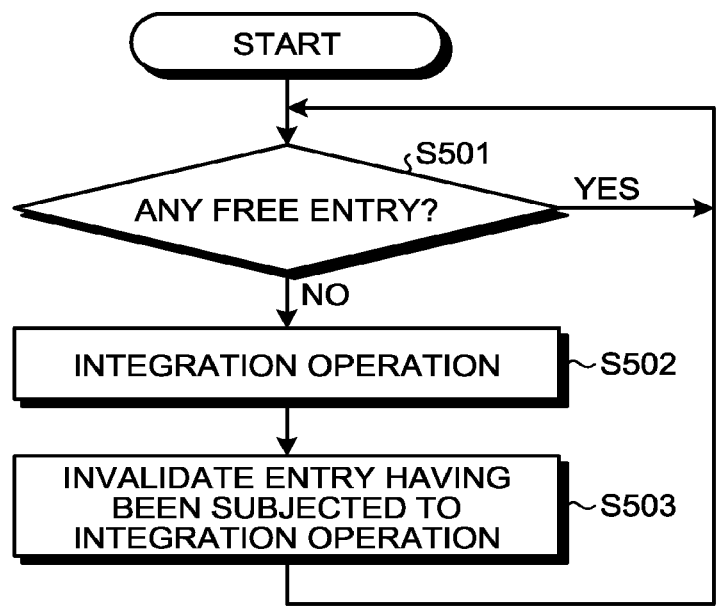
FIG. 12 is a schematic and illustrative flowchart of an integration operation of an integration unit in the first embodiment.

FIG. 12 is a schematic and illustrative flowchart of the integration operation of the integration unit 150 in the first embodiment. The integration unit 150 determines whether or not the difference table 300 includes a free entry (S501). If the difference table 300 includes a free entry (Yes in S501), the integration unit 150 re-executes S501. After determining that the difference table 300 includes no free entry (No in S501), the integration unit 150 executes an integration operation (S502).

In S502, the integration unit 150 selects, for example, one or more entries having entered a valid state most previously, as an integration target entry. The integration unit 150 then updates the logical address-physical address translation table 202 with the record in the integration target entries. A selecting method of an integration target entry is not limited to this example. The integration unit 150 can select an integration target entry by any method.

Subsequent to S502, the integration unit 150 invalidates the entry having been subjected to the integration operation (S503). In other words, the integration unit 150 sets the valid bit VB of the entry concerned to a value indicating invalid.

After S503, the control returns to S501.

The number of entries to select as an integration target entry is not limited to one. For example, upon determining as No in S501, the integration unit 150 may select all valid entries as integration targets. The integration unit 150 sequentially sets individual entries with the valid bit VB indicating a value of valid, as integration targets, and executes the operations to the set entries in S502 and S503. Thus, the integration unit 150 repeatedly executes the integration operation until all the entries become free. The integration unit 150 may repeatedly execute the operations in S502 and S503 until the number of free entries reaches or exceeds a given value.

As described above, according to the first embodiment, upon satisfaction of the condition that both of the logical address range and the physical address range of write data follows ranges related to a correspondence recorded in an entry of the difference table 300, the memory controller 100 updates the entry at the time of non-volatilizing the write data. With no such an entry found, the memory controller 100 records, in a free entry, a correspondence between the ranges in which the write data is located.

This can reduce the speed at which free entries are used and lower the frequency at which the integration operation is executed, resulting in avoiding degradation of performance of the memory system 1. In other words, usability is improved.

Moreover, each correspondence to be recorded in the difference table 300 includes length information. The memory controller 100 updates length information recorded in an existing entry being a subject of update.

Thus, the notified correspondence is not recorded in a free entry but in the difference table 300 to update a recorded correspondence therein. This can reduce the speed at which free entries are used.

Moreover, the memory controller 100 stores the previously updated entry, and determines whether or not the logical address range and the physical address range related to the notified correspondence follows the logical address range and the physical address range recorded in the entry.

This makes it possible to omit the search process for an entry to update.

The memory controller 100 may be configured to search the difference table 300 for an entry that satisfies the above condition.

Moreover, the memory controller 100 stores LA_TAIL_LAST and PA_TAIL_LAST as tail end information corresponding to the tail ends of a logical address range and a physical address range indicated by a correspondence recorded in a previously updated entry. The memory controller 100 then determines whether or not the notified correspondence has continuity on the basis of the tail end information.

Consequently, the memory controller 100 can easily determine whether or not the notified correspondence has continuity.

The tail end information is not limited to the above example. For example, the tail end information on the logical address range can be a value found by adding the length L to the logical address LA recorded in the previously updated entry and subtracting one from a resultant. In this case, the memory controller 100 determines whether or not a logical address range indicated by the update notification follows a logical address range of previously written data, on the basis of whether or not the value found by adding one to the tail end information matches LA_HEAD_NEW.

The tail end information on the physical address range can be a value found by adding the length L to the physical address PA recorded in the previously updated entry and subtracting one from a resultant. In this case, the memory controller 100 determines whether or not a physical address range indicated by the update notification follows a physical address range of previously written data, on the basis of whether or not a value found by adding one to the tail information matches PA_HEAD_NEW.

Upon satisfaction of a given trigger condition, the memory controller 100 integrates contents of one or more of the entries of the difference table 300 in the entries of the logical address-physical address translation table 202 through the integration operation, and places the one or more entries in a ready state for recording of a new correspondence.

This creates free entries, making it possible to resume non-volatilization.

The above embodiment has described the example that the integration operation is executed when no free entries are available. The trigger condition for executing the integration operation is not limited to this example. For example, the trigger condition for executing the integration operation can be such that the number of free entries falls below a given threshold.

Moreover, the memory controller 100 includes the non-volatilization unit 120 and the difference table management unit 140. For non-volatilization, the non-volatilization unit 120 generates an update notification indicating a correspondence between a logical address range of write data and a physical address range of a writing destination of the write data. The difference table management unit 140 determines whether or not the notified correspondence exhibits continuity. After determining that the notified correspondence exhibits continuity, the difference table management unit 140 records the correspondence in an existing entry of the difference table 300 to update its contents.

This can reduce the speed at which free entries are used.

In non-volatilizing two or more items of write data stored in the buffer memory 121 through a single non-volatilization in response to two or more write requests by different write commands, the non-volatilization unit 120 can generate an update notification for each of the items of write data.

Second Embodiment

The logical address space of a memory system may be divided into a plurality of partial spaces to provide the partial spaces to different hosts. According to the NVM Express (registered trademark) standard, such a partial space is referred to as a namespace. According to the universal flash storage (UFS) standard, such a partial space is referred to as a logical unit number (LUN).

A second embodiment will describe an example of applying the NVM Express (registered trademark) standard. In other words, in the second embodiment, the memory system 1 is configured to provide a plurality of namespaces as the partial spaces. The memory system 1 may provide a plurality of LUNs as the partial spaces in compliance with the UFS standard.

The following mainly describe differences from the first embodiment. A description of the same or like configurations as those of the first embodiment may be omitted or they may be briefly described.

Figure 13:
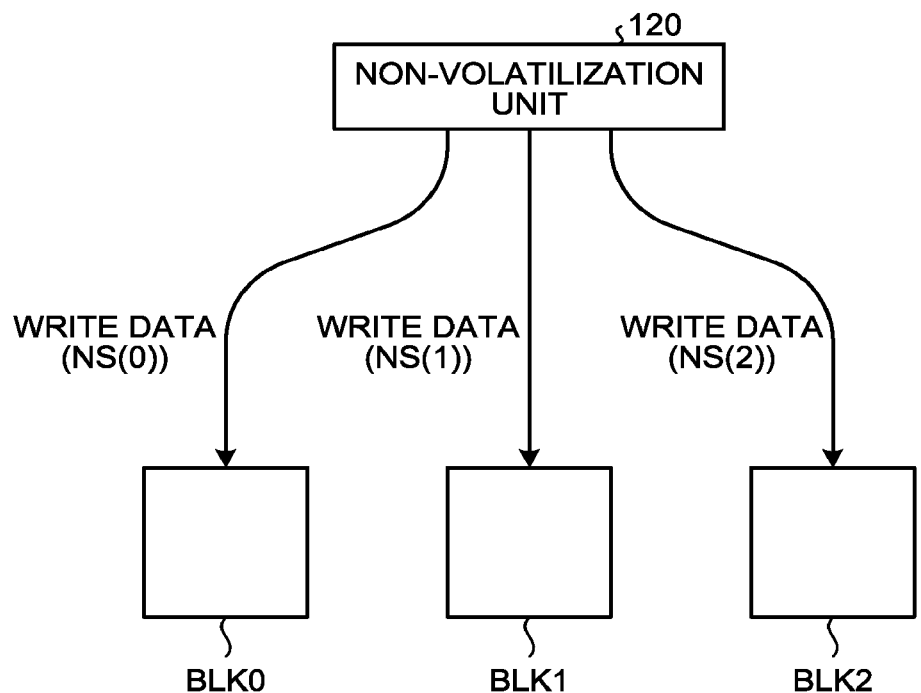
FIG. 13 is a schematic and illustrative diagram for explaining writing destinations of write data in a second embodiment.
Figure 14A:
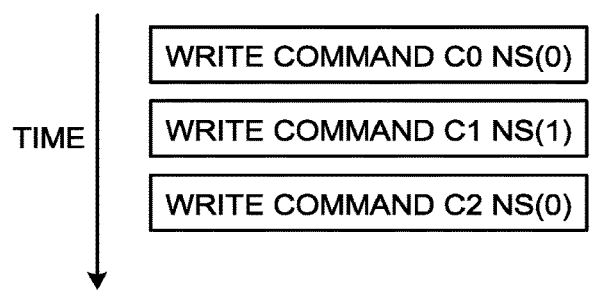
FIGS. 14A and 14B are schematic and illustrative diagrams for explaining writing destinations of write data in the second embodiment.
Figure 14B:
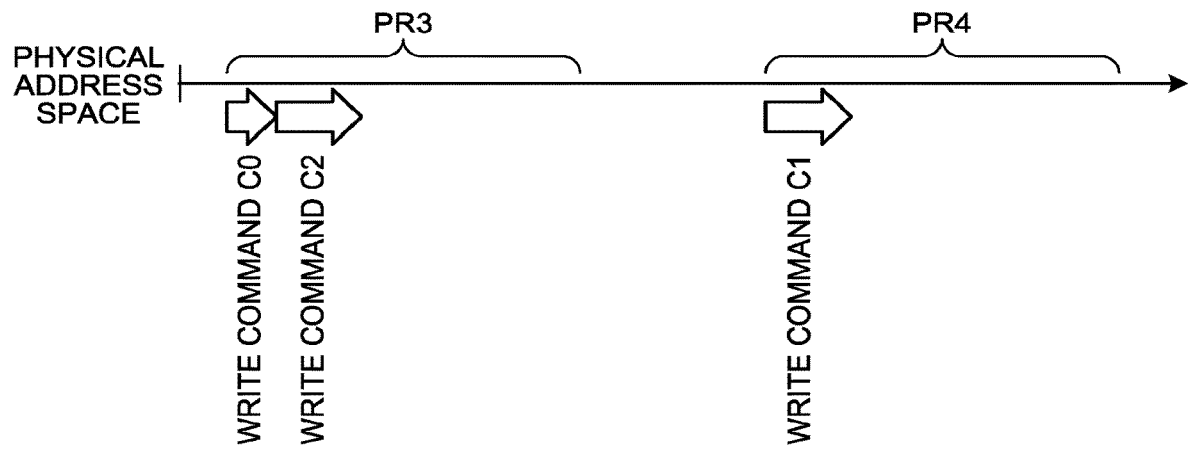

FIG. 13 and FIGS. 14A and 14B are schematic and illustrative diagrams for explaining writing destinations of write data in the second embodiment.

To provide a plurality of namespaces (NS(0), NS(1), NS(2), . . . ) as illustrated in FIG. 13, the non-volatilization unit 120 prepares a plurality of input blocks (BLK0, BLK1, BLK2, . . . ), and associates the namespaces with the input blocks one by one. In writing write data to the NAND memory 200, the non-volatilization unit 120 writes the write data to an input block associated with a namespace of the write data. Consequently, the write data is written to continuous areas associated with different namespaces.

FIGS. 14A and 14B are schematic diagrams for explaining a physical address range of writing destinations of write data in the memory system 1 having the namespaces set. As illustrated in FIG. 14A, a write command C0 designating the namespace NS(0), a write command C1 designating the namespace NS(1), and a write command C2 designating the namespace NS(0) are issued as writing destinations in this order.

In this case, for example, in response to a write request by the write command C0, write data is written to the block BLK0. Next, in response to a write request by the write command C1, write data is written to the block BLK1. Lastly, in response to a write request by the write command C2, write data is written to the block BLK0. That is, requested by the write command C0 and by the write command C2, the two items of write data are written to the same block BLK0. Requested by the write command C1, the write data is written to a different block BLK1 from the block BLK0.

As a result, as illustrated in FIG. 14B, the physical address ranges of the written data requested by the write command C0 and the written data requested by the write command C2 are continuous with each other. The physical address range of the written data requested by the write command C1 is not continuous with either the range of the written data requested by the write command C0 or the range of the written data requested by the write command C2.

In other words, in response to write requests by write commands designating the namespace NS(0) as a writing destination, items of write data are written sequentially to a given range PR3 with consecutive addresses from the head. In response to write requests by write commands designating the namespace NS(1) as a writing destination, items of write data are written sequentially to a given range PR4 with consecutive physical addresses from the head. Consequently, items of write data are written to a continuous area with different namespaces.

Thus, each input block is prepared for each namespace. In the case of consecutively writing two items of write data of one namespace to the NAND memory 200, the physical address ranges of writing destinations of the two items of write data are continuous even when write operations of the two items of write data are interrupted by another write operation of write data of another name space.

Figure 15:
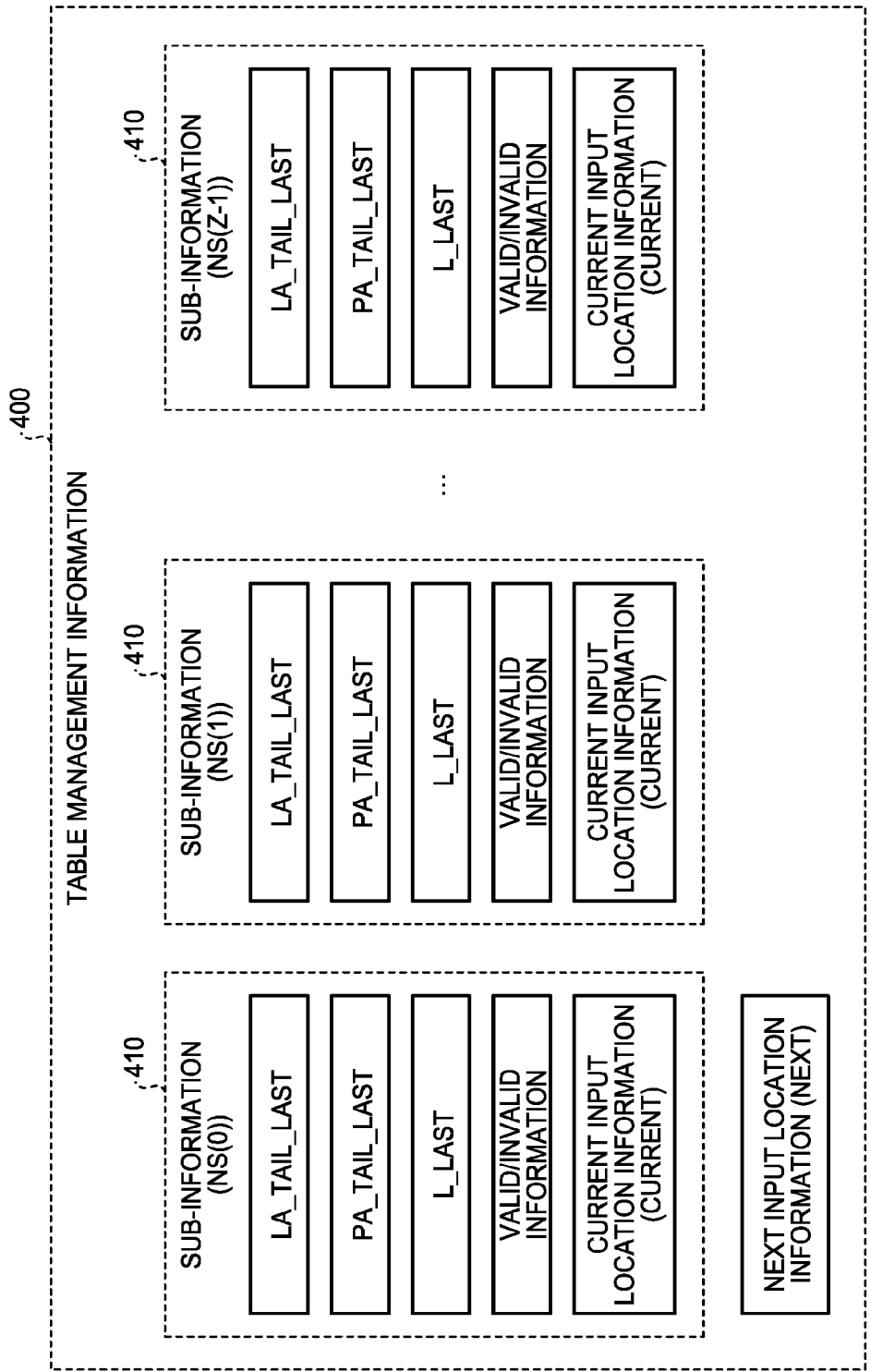
FIG. 15 is a schematic and illustrative diagram of the configuration of table management information in the second embodiment.

Hence, in the second embodiment, the difference table management unit 140 determines continuity for each namespace. The table management information 400 includes sub-information for each namespace, as illustrated in FIG. 15.

Items of sub-information correspond to namespaces on a one-to-one basis. Each item of sub-information includes a logical address LA_TAIL_LAST, a physical address PA_TAIL_LAST, a length L_LAST, valid/invalid information, and current input location information CURRENT.

CURRENT indicates a previously updated entry related to a corresponding namespace.

LA_TAIL_LAST represents a value found by adding a length L to a logical address LA both recorded in the entry indicated by CURRENT.

PA_TAIL_LAST represents a value found by adding the length L to a physical address PA both recorded in the entry indicated by CURRENT.

In other words, according to the second embodiment, the table management information 400 includes tail end information for each namespace.

L_LAST represents the length L recorded in the entry indicated by CURRENT.

The valid/invalid information indicates whether sub-information on a corresponding namespace is valid or invalid.

The table management information 400 includes next input location information NEXT. NEXT indicates a free entry in which a correspondence can be recorded next.

Figure 16:
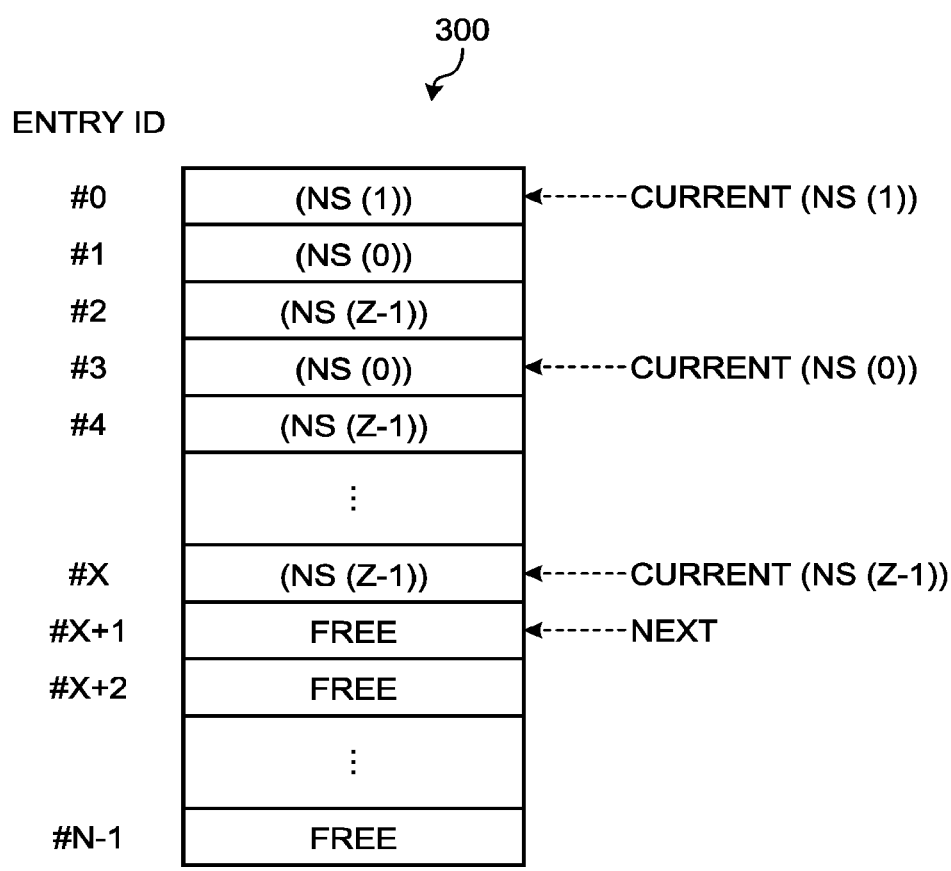
FIG. 16 is a schematic and illustrative diagram for explaining a relationship between NEXT and a plurality of CURRENTs, which are included in the table management information in the second embodiment.

FIG. 16 is a schematic and illustrative diagram for explaining a relationship between NEXT and a plurality of CURRENTs contained in the table management information 400 in the second embodiment.

In the example of FIG. 16, the difference table 300 shows that, of N entries, entries #0 to # X contain inputs and entries # X+1 to # N−1 are free. Correspondences are recorded in the difference table 300 regardless of namespaces. Each CURRENT indicates a previously updated entry related to a corresponding name space.

In the example of FIG. 16, CURRENT (NS(0)) indicates that a previously updated entry related to the namespace NS(0) is the entry #3. CURRENT (NS(1)) indicates that a previously updated entry related to the namespace NS(1) is the entry #0. CURRENT (NS(Z−1)) indicates that a previously updated entry related to the namespace NS(Z−1) is the entry # X.

NEXT indicates the first entry # X+1 of the free entries (# X+1 to # N−1).

Figure 17:
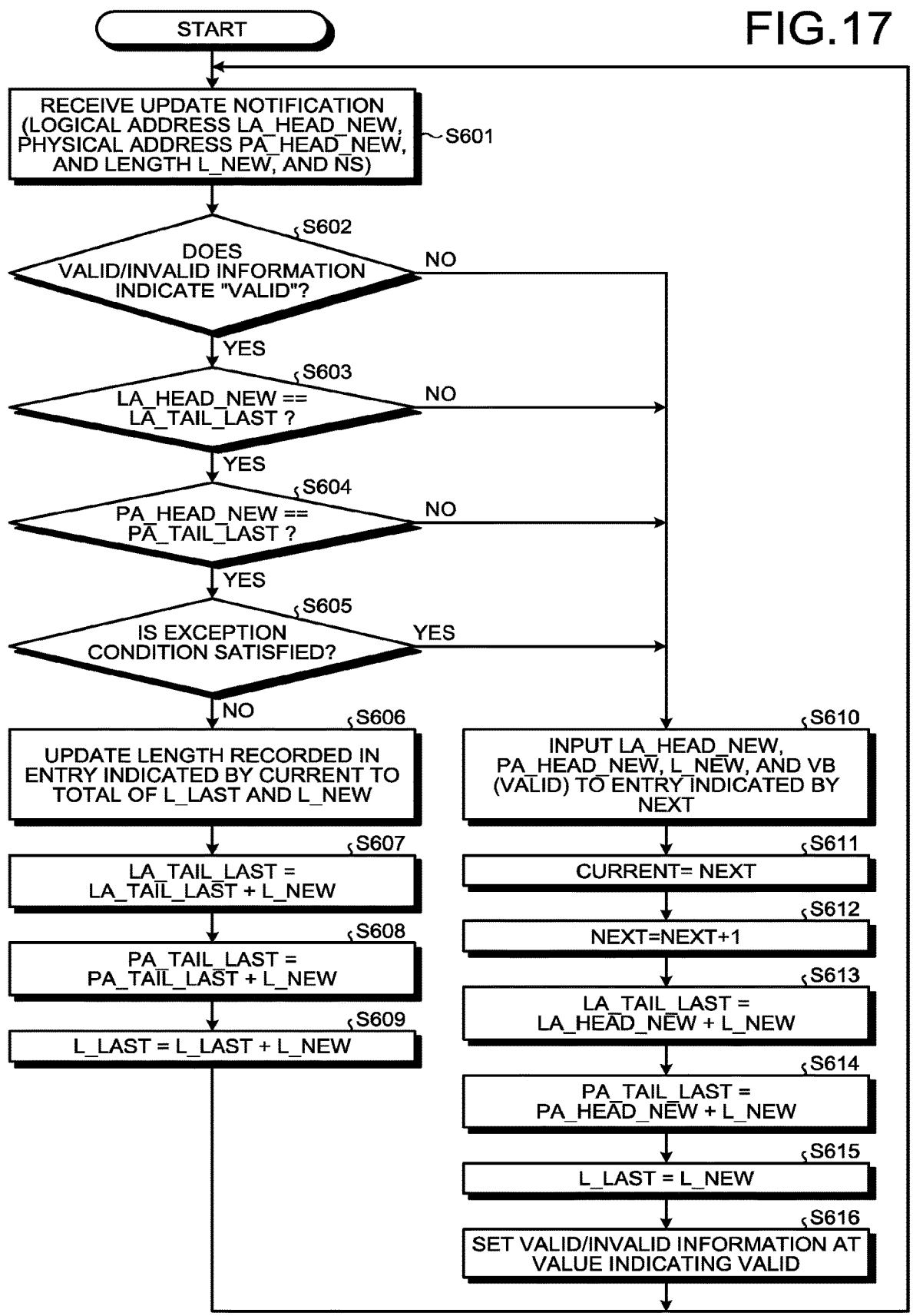
FIG. 17 is a schematic and illustrative flowchart of the operation of a difference table management unit for recording in a difference table in the second embodiment.

FIG. 17 is a schematic and illustrative flowchart of the recording in the difference table 300 by the difference table management unit 140 in the second embodiment. The difference table management unit 140 receives an update notification (S601).

The update notification received by the difference table management unit 140 in S601 includes a logical address LA_HEAD_NEW at a starting point of a logical address range of write data, a physical address PA_HEAD_NEW at a starting point of a physical address range of written data, and a length L_NEW. The update notification further includes identification information NS of a namespace of a writing destination. Identification information NS is included in, for example, a write command. The non-volatilization unit 120 records identification information NS included in a write command in an update notification, and transmits the update notification containing identification information NS to the difference table management unit 140.

In the following process, among multiple items of sub-information included in the table management information 400, an item of sub-information on a namespace identified by the information NS included in the update notification is used.

Following S601, the difference table management unit 140 determines whether or not valid/invalid information included in the sub-information corresponding to the namespace indicates valid (S602).

After determining that the valid/invalid information indicates valid (Yes in S602), the difference table management unit 140 determines whether or not LA_HEAD_NEW matches LA_TAIL_LAST (S603). By this operation, the difference table management unit 140 determines whether or not a logical address range indicated by the update notification follows a logical address range of previous written data related to the same namespace.

After determining that LA_HEAD_NEW matches LA_TAIL_LAST (Yes in S603), that is, that the logical address range indicated by the update notification follows the logical address range of the previously written data related to the same namespace, the difference table management unit 140 further determines whether or not PA_HEAD_ NEW matches PA_TAIL_LAST (S604). By this operation, the difference table management unit 140 determines whether or not a physical address range indicated by the update notification follows a physical address range of the previously written data related to the same namespace.

PA_HEAD_NEW matching PA_TAIL_LAST (Yes in S604), that is, the physical address range indicated by the update notification following the physical address range of the previously written data related to the same namespace signifies that continuity of the notified correspondence is verified through the process S601 to S604. Hence, the difference table management unit 140 can update a previously updated entry related to the same namespace, i.e., an entry indicated by CURRENT, however, the difference table management unit 140 determines whether or not an exception condition is satisfied first (S605).

The exception condition is a condition for recording a notified correspondence having continuity in a free entry. The exception condition can be set to any condition. A third embodiment will describe an exemplary exception condition below.

Without satisfaction of the exception condition (No in S605), the difference table management unit 140 records the notified correspondence in an existing entry of the difference table 300 to update the entry. Specifically, the difference table management unit 140 updates a length recorded in the entry indicated by CURRENT to a total of L_LAST and L_NEW (S606). Before S606, L_LAST matches the length recorded in the entry indicated by CURRENT. The difference table management unit 140 may read the length from the entry indicated by CURRENT and add L_NEW to the read length to acquire an updated value.

Next, the difference table management unit 140 updates sub-information in accordance with the updated contents of the entry indicated by CURRENT. Specifically, the difference table management unit 140 updates LA_TAIL_LAST to a value found by adding L_NEW to LA_TAIL_LAST (S607), updates PA_TAIL_LAST to a value found by adding L_NEW to PA_TAIL_LAST (S608), and updates L_LAST to a value found by adding L_NEW to L_LAST (S609). Through this operation, the sub-information is updated to contents corresponding to the contents updated in S606.

If the valid/invalid information indicates invalid (No in S602), if LA_HEAD_NEW does not match LA_TAIL_LAST (No in S603), if PA_HEAD_NEW does not match PA_TAIL_LAST (No in S604), or if the exception condition is satisfied (Yes in S605), the difference table management unit 140 records the notified correspondence in a new entry. Specifically, the difference table management unit 140 inputs LA_HEAD_NEW, PA_HEAD_NEW, L_NEW, and VB (valid) to an entry indicated by the next input location information NEXT (S610).

The difference table management unit 140 then updates the sub-information and NEXT in accordance with the record in the new entry. Specifically, the difference table management unit 140 sets an entry ID indicated by NEXT to CURRENT in an overwriting manner (S611) and updates NEXT to a value found by adding one to NEXT (S612). The difference table management unit 140 updates LA_TAIL_LAST to a value found by adding L_NEW to LA_HEAD_NEW (S613), updates PA_TAIL_LAST to a value found by adding L_NEW to PA_HEAD_NEW (S614), and updates L_LAST to L_NEW (S615). The difference table management unit 140 then sets the valid/invalid information to a value indicating valid (S616). Through these operations, the sub-information is updated to the contents recorded in the new entry.

After S609 or S616, the control returns to S601.

As described above, according to the second embodiment, the memory system 1 provides divided partial spaces (for example, namespaces) of a logical address space to the host 2. The memory controller 100 stores sub-information in each partial space.

Thereby, the memory controller 100 can determine continuity in unit of partial space.

Third Embodiment

A third embodiment will describe the exception condition. The third embodiment can be applied to both of the first and second embodiments.

In the third embodiment, the logical address-physical address translation table 202 is divided into a plurality of sub-tables. The integration operation is executed on a sub-table basis. In other words, a sub-table including a correspondence as an integration target is read from the NAND memory 200 to a volatile memory, for example, the buffer memory 121. The sub-table is updated on the buffer memory 121, and the updated sub-table is written back to the NAND memory 200.

A boundary of the divisions of the logical address-physical address translation table 202 is set for the logical address space per given size. A space of a given size between two adjacent boundaries is referred to as a region. That is, the logical address space is divided into a plurality of regions, and a correspondence between a logical address and a physical address is managed on the basis of a table for each region (that is, a sub-table).

Figure 18:
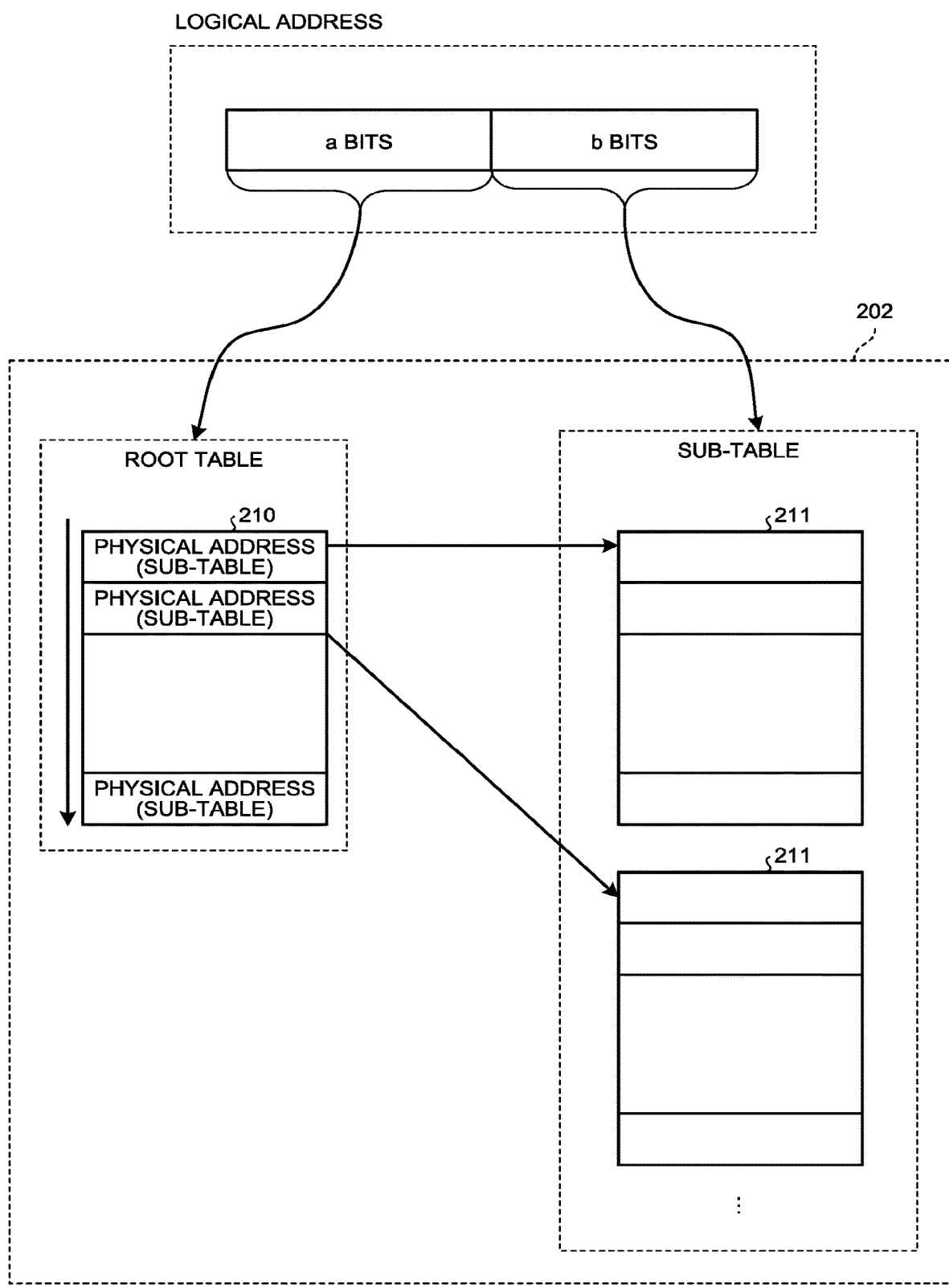
FIG. 18 is a schematic and illustrative diagram for explaining sub-tables in a third embodiment.

FIG. 18 is a schematic and illustrative diagram for explaining sub-tables in the third embodiment. As illustrated in FIG. 18, the logical address-physical address translation table 202 includes a root table 210 and a plurality of sub-tables 211.

According to the example of FIG. 18, the logical address space is divided into $2^a$ regions. Each region is identified from high-order bits of a logical address. Herein, "a" is defined as a positive integer. The root table 210 associates the high-order bits of the logical address with a physical address in which a sub-table related to a region identified by a-bit information is stored. For example, the root table 210 includes $2^a$ entries. Each of the $2^a$ entries contains a physical address designating a stored location of a corresponding sub-table 211.

According to the example of FIG. 18, each region includes $2^b$ consecutive logical addresses. Herein, "b" is defined as a positive integer. Each sub-table 211 associates each of the $2^b$ consecutive logical addresses in a corresponding region with a physical address. Each sub-table 211 includes, for example, $2^b$ entries. Each of the $2^b$ entries contains a physical address corresponding to a logical address.

A logical address is generally assigned in size unit of sector. In the third embodiment, a correspondence between a logical address and a physical address is managed in size unit of cluster that is a group of sectors having consecutive logical addresses. A cluster is smaller in size than a region. In the following, data in unit of cluster may be referred to as a cluster.

According to the example of FIG. 18, all the sub-tables 211 belong to one hierarchy. A set of the sub-tables 211 of the logical address-physical address translation table 202 may have a hierarchical structure of a plurality of levels.

Next, the difference table 300 is described. As in the first and second embodiments, an entry refers to an entry of the difference table 300 below.

In the case of managing a plurality of correspondences having continuity in one entry, a range indicated by the correspondences recorded in one entry may include a plurality of regions. In this case, the number of entries does not match the number of sub-tables 211 to be read from the NAND memory 200 in the integration operation. This may require estimation of the number of sub-tables 211 to be read from the NAND memory 200 in the integration operation. This is because the number of the sub-tables 211 to be readable to the buffer memory 121 is finite.

In the third embodiment, as to a logical address range, of non-volatilized write data, across a region boundary, the non-volatilization unit 120 and the difference table management unit 140 are configured to record a correspondence related to the logical address range prior to the region boundary and a correspondence related to the logical address range subsequent to the region boundary in different entries. This makes it possible to equalize the number of entries and the number of the sub-tables 211 to be read from the NAND memory 200. This eliminates the necessity for estimating the number of the sub-tables 211 to be read from the NAND memory 200.

Figure 19:
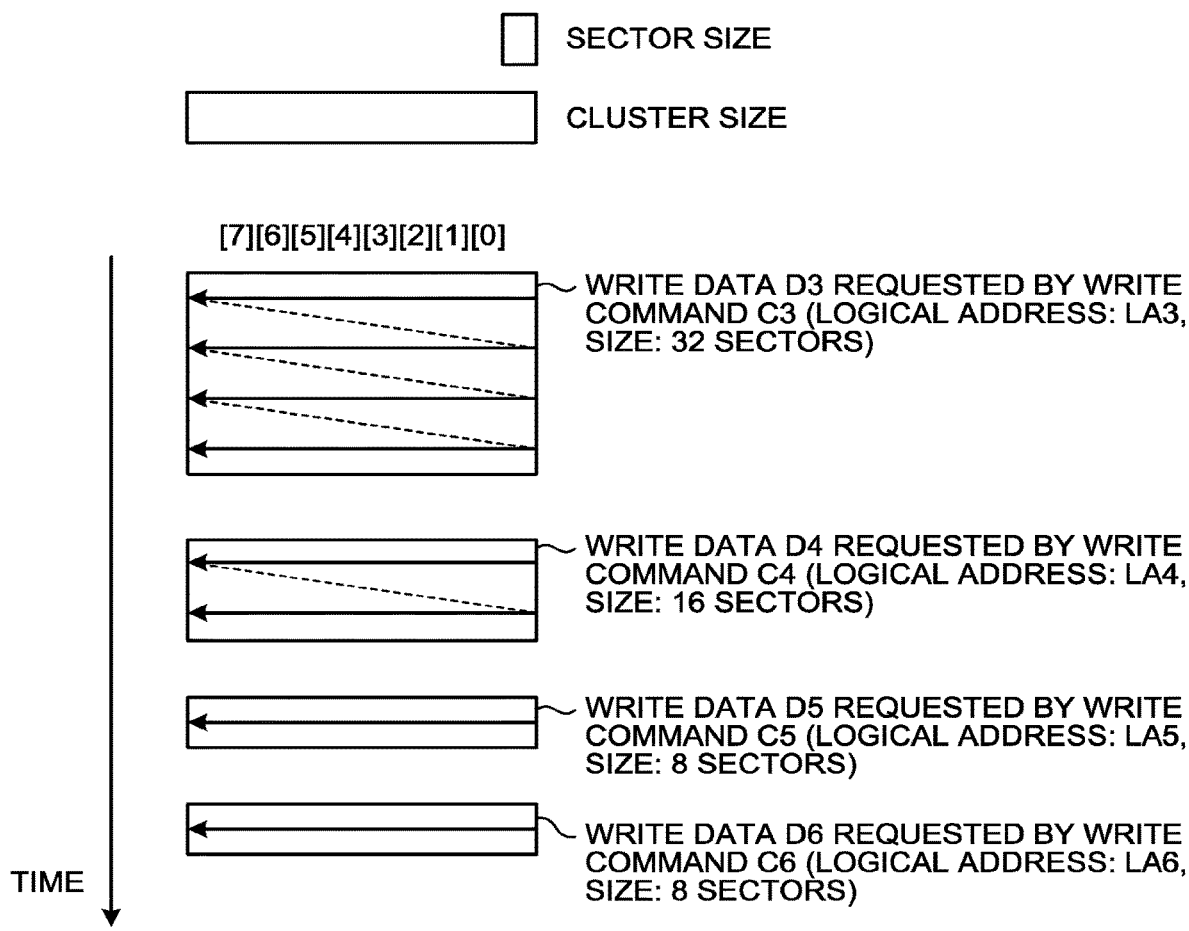
FIG. 19 is a schematic and illustrative diagram for explaining an exemplary relationship between write commands and the locations and sizes of write data in the third embodiment.

FIG. 19 is a schematic and illustrative diagram for explaining an exemplary relationship between write commands and the locations and sizes of write data in the third embodiment. In the example of FIG. 19, the size of a cluster is set to eight times the size of a sector. Logical addresses of eight sectors of one cluster are aligned in a direction from the right to the left in FIG. 19. The direction of the arrow indicates time at which write data is received.

In the example of FIG. 19, write commands C3, C4, C5, and C6 are issued in this order. The write command C3 is a command for a write request for write data D3 having a logical address LA3 at a head and a size of 32 sectors. The write command C4 is a command for a write request for write data D4 having a logical address LA4 at a head and a size of 16 sectors. The write command C5 is a command for a write request for write data D5 having a logical address LA5 at a head and a size of eight sectors. The write command C6 is a command for a write request for write data D6 having a logical address LA6 at a head and a size of eight sectors.

In FIG. 19, the write data to be written by each write command has a size of an integral multiple of a cluster. The size of the write data to be written by each write command is not limited to an integral multiple of a cluster. The write data to be written by each write command may have any size of an integral multiple of a sector.

The write data D3 to D6, having the total size corresponding to one page, is non-volatilized through one non-volatilization.

Figure 20:
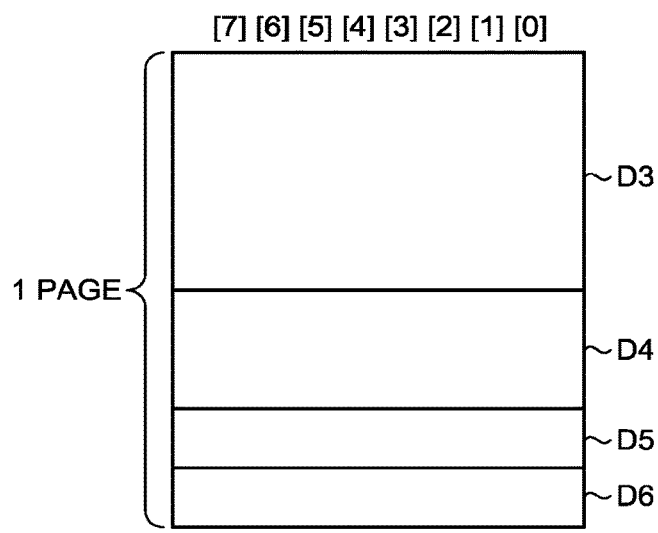
FIG. 20 is a schematic and illustrative diagram for explaining an exemplary arrangement of four items of write data non-volatilized through one non-volatilization in the third embodiment.

FIG. 20 is a schematic and illustrative diagram for explaining an exemplary arrangement of four items of write data non-volatilized by one non-volatilization in the third embodiment. Physical addresses of eight sectors of one cluster are aligned in a direction from the right to the left in FIG. 20. Physical addresses of a plurality of clusters are aligned in a direction from the top to the bottom in FIG. 20.

As illustrated in FIG. 20, the four items of write data D3 to D6 are packed in one page by one non-volatilization. In the non-volatilization, the non-volatilization unit 120 sequentially determines from a head cluster of each of the four items of write data D3 to D6 whether or not the cluster is located at the tail end of the write data. The non-volatilization unit 120 also determines whether or not the cluster is located at the tail end of a region. The non-volatilization unit 120 further determines whether or not the cluster is located at the tail end of the aggregate of the non-volatilized write data D3 to D6. The non-volatilization unit 120 then generates an update notification at timing based on the results of the determination. Specifically, after determining that the cluster in question is located at the tail end of the write data, after determining that the cluster in question is located at the tail end of a region, or after determining that the cluster in question is located at the tail end of the aggregate of the non-volatilized write data D3 to D6, the non-volatilization unit 120 generates an update notification.

The following describes an exemplary operation of the memory system 1 of the third embodiment.

Figure 21:
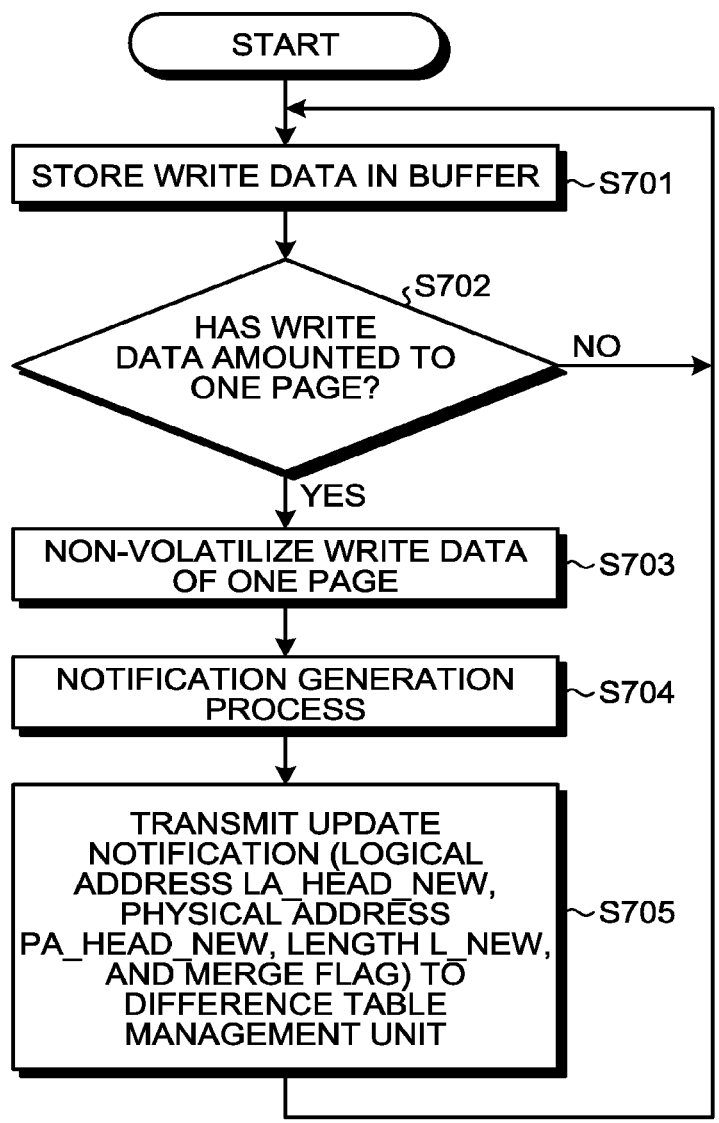
FIG. 21 is a schematic and illustrative flowchart of the operation of a non-volatilization unit in the third embodiment.

FIG. 21 is a schematic and illustrative flowchart of the operation of the non-volatilization unit 120 in the third embodiment. After receiving a logical address and write data from the command analysis unit 110, the non-volatilization unit 120 stores the received write data in the buffer memory 121 (S701).

The non-volatilization unit 120 then determines whether or not the write data stored in the buffer memory 121 has amounted to one page (S702). The write data stored in the buffer memory 121 having amounted to one page is an exemplary trigger condition for executing the non-volatilization. The trigger condition for executing the non-volatilization is not limited to this example.

After determining that the write data stored in the buffer memory 121 has amounted to one page (Yes in S702), the non-volatilization unit 120 non-volatilizes the write data of one page (S703). The write data of one page may include multiple items of write data requested by different write commands. In such a case the multiple items of write data is non-volatilized in S703.

Next, the non-volatilization unit 120 generates an update notification in a notification generation process (S704). The update notification includes a merge flag in addition to the logical address LA_HEAD_NEW, the physical address PA_HEAD_NEW, and the length L_NEW.

The merge flag indicates recording of two correspondences in one entry or in different entries. Herein, as an example, the merge flag indicating ON signifies that recording of a correspondence in an existing entry for update is requested. The merge flag indicating OFF signifies that recording of a correspondence in a new entry is requested. The merge flag will be described in detail in relation to the operation.

The non-volatilization unit 120 transmits the generated update notification to the difference table management unit 140 (S705). The control then returns to S701.

Figure 22:
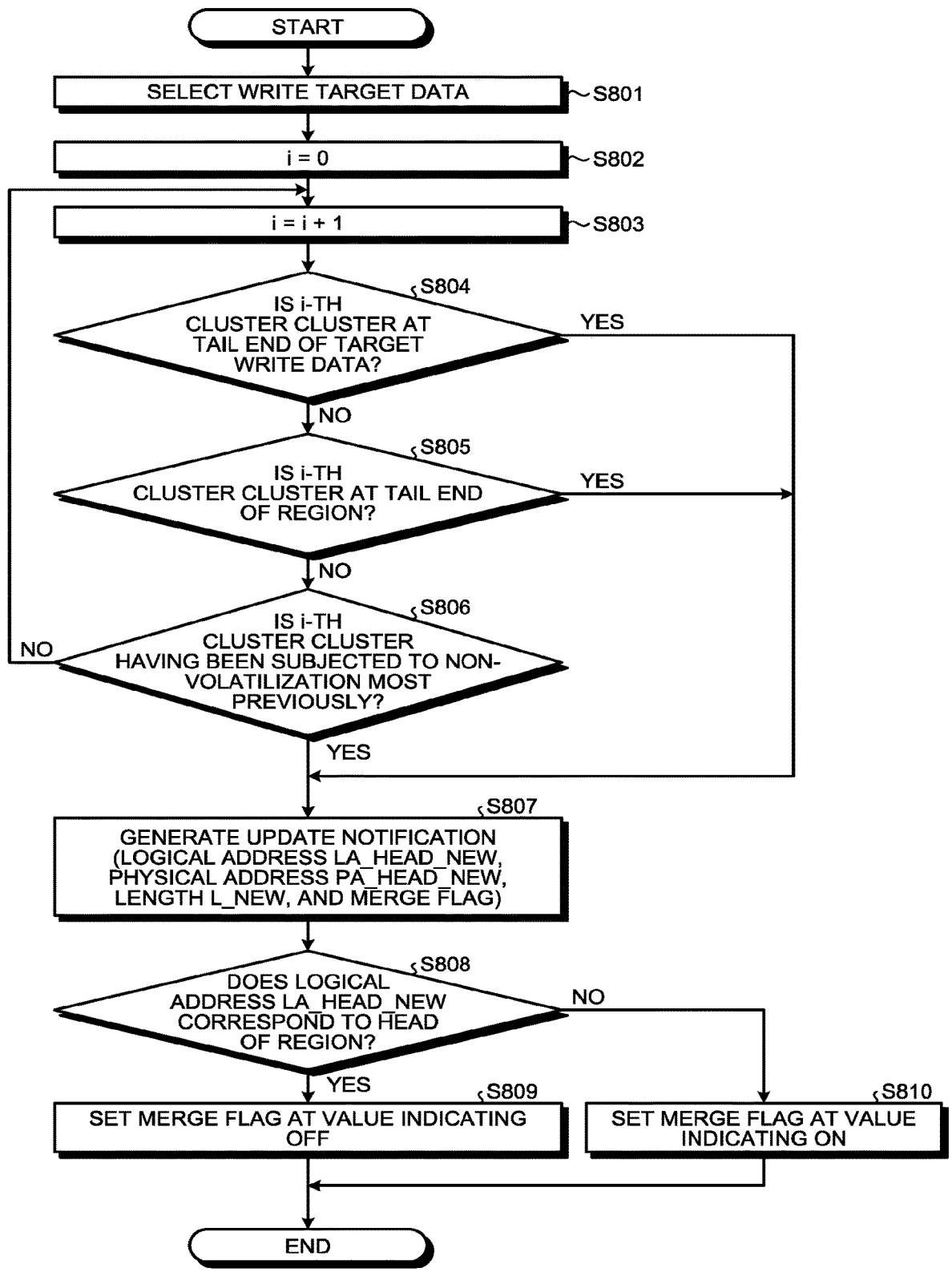
FIG. 22 is a schematic and illustrative flowchart of a notification generation process according to the third embodiment.

FIG. 22 is a schematic and illustrative flowchart of the notification generation process according to the third embodiment.

Firstly, the non-volatilization unit 120 selects write data requested by one write command from the non-volatilized write data of one page (S801).

In the following operation, the non-volatilization unit 120 detects, from among one or more clusters of the write data selected in S801, a cluster at the tail end of the write data, a cluster at the tail end of the region, and the last cluster of the non-volatilized data. The write data selected in S801 is referred to as write target data below.

Specifically, the non-volatilization unit 120 initializes a loop index "i", to be used in the following loop operation, to zero (S802). The non-volatilization unit 120 then increments the value of the loop index i by one (S803), and determines whether or not the i-th cluster from the head of the write target data is the cluster at the tail end of the write target data (S804).

If the i-th cluster from the head of the write target data is not the cluster at the tail end of the write target data (No in S804), the non-volatilization unit 120 determines whether or not the i-th cluster from the head of the write target data is the cluster at the tail end of the region (S805).

Whether or not the cluster is the cluster at the tail end of the region can be determined with reference to a logical address of the cluster. This is because the logical address of a region boundary is uniquely determined by the size of the region.

If the i-th cluster from the head of the write target data is not the cluster at the tail end of the region (No in S805), the non-volatilization unit 120 determines whether or not the i-th cluster from the head of the write target data is the last one of the clusters having been subjected to non-volatilization (S806).

If the i-th cluster from the head of the write target data is the cluster at the tail end of the write data (Yes in S804), if the i-th cluster from the head of the write target data is the cluster at the tail end of the region (Yes in S805), or if the i-th cluster from the head of the write target data is the last one of the clusters having been subjected to non-volatilization (Yes in S806), the non-volatilization unit 120 generates one update notification (S807).

The update notification includes the logical address LA_HEAD_NEW, the physical address PA_HEAD_NEW, the length L_NEW, and the merge flag. Herein, LA_HEAD_NEW represents the logical address of a cluster being at the head of the write target data. PA_HEAD_NEW represents a physical address designating a stored location of the cluster being at the head of the write target data. L_NEW represents a total size of the clusters from the head of the write target data to the i-th cluster. The merge flag can be set to any value in S807

Next, the non-volatilization unit 120 determines whether or not LA_HEAD_NEW corresponds to a logical address of the head of the region (S808). If LA_HEAD_NEW corresponds to a logical address of the head of the region (Yes in S808), the non-volatilization unit 120 sets the merge flag to a value indicating OFF (S809). If LA_HEAD_NEW does not correspond to a logical address of the head of the region (No in S808), the non-volatilization unit 120 sets the merge flag to a value indicating ON (S810).

After S809 or S810, the notification generation process ends.

The non-volatilized write data of one page may include multiple items of write data requested by different write commands. In such a case the non-volatilization unit 120 executes a series of operation illustrated in FIG. 22 to each of the items of write data requested by different write commands.

Figure 23:
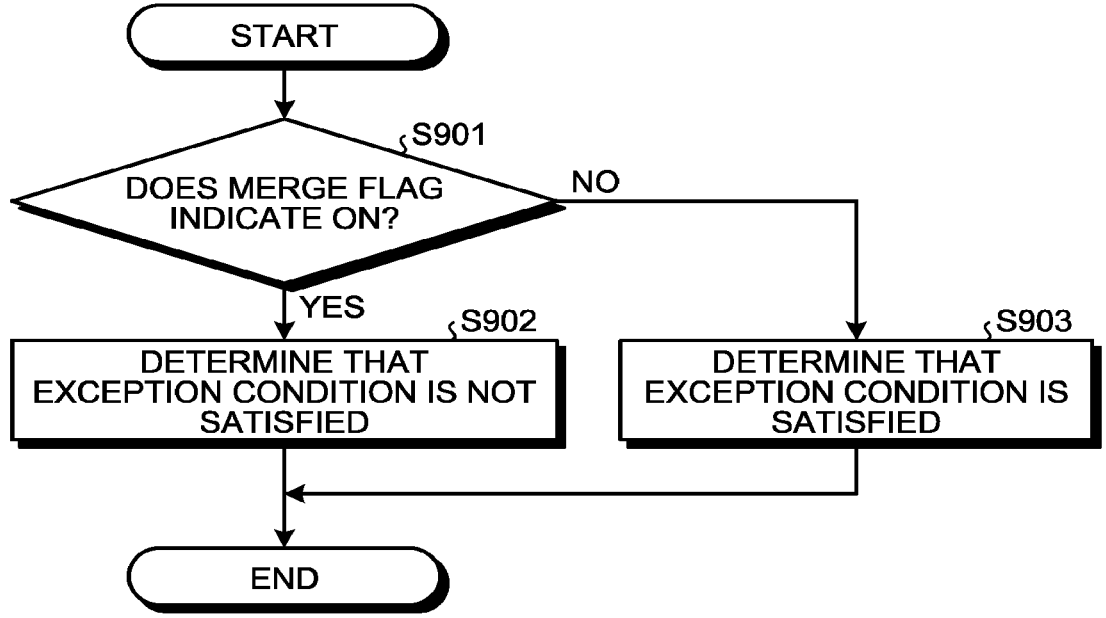
FIG. 23 is a schematic and illustrative flowchart of determining an exception condition by a difference table management unit in the third embodiment.

FIG. 23 is a schematic and illustrative flowchart of the determination on the exception condition by the difference table management unit 140 in the third embodiment.

After determining that the notified correspondence has continuity in the course of recording a correspondence indicated by the received update notification in the difference table 300, the difference table management unit 140 determines whether or not the exception condition is satisfied (for example, S405 of FIG. 11 or S605 of FIG. 17).

In the third embodiment, the difference table management unit 140 refers to a merge flag included in the update notification to determine whether or not the merge flag indicates ON (S901). If the merge flag indicates ON (Yes in S901), the difference table management unit 140 determines that the exception condition is not satisfied (S902). If the merge flag does not indicate ON (No in S901), that is, indicates OFF, the difference table management unit 140 determines satisfaction of the exception condition (S903). After S902 or S903, the determination on satisfaction or non-satisfaction of the exception condition ends.

That is, upon satisfaction of the condition that the logical and physical address ranges of the written data, indicated by the update notification, follow the logical and physical address ranges whose correspondence has been recorded in the difference table 300, the difference table management unit 140 records a correspondence indicated by the update notification in a free entry if the head of the range of the written data matches the head of the region.

Upon satisfaction of the condition that the logical and physical address ranges of the written data, indicated by the update notification, follow the logical and physical address ranges whose correspondence has been recorded in the difference table 300, if the head of the range of the written data does not match the head of the region, the difference table management unit 140 records the correspondence indicated by the update notification in an existing entry of the difference table 300 to update its contents.

This makes it possible to record a correspondence related to the range prior to a region boundary and a correspondence related to the range subsequent to the region boundary in different entries.

Figure 24:
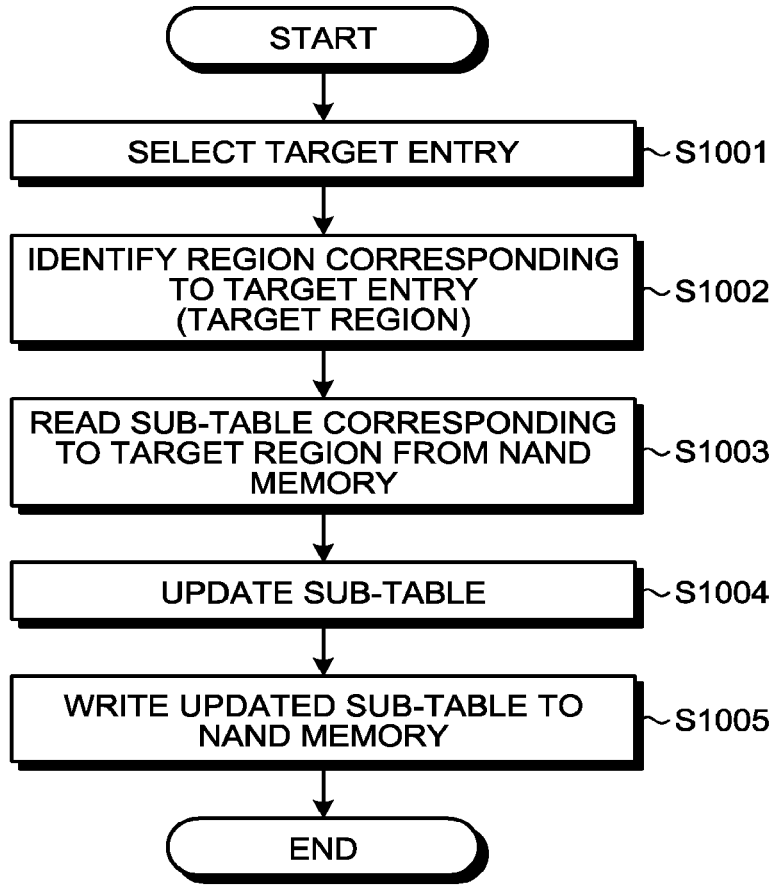
FIG. 24 is a schematic and illustrative flowchart of an exemplary integration operation to be executed by an integration unit according to the third embodiment.

FIG. 24 is a schematic and illustrative flowchart of an exemplary integration operation to be executed by the integration unit 150 according to the third embodiment. A series of operations illustrated in FIG. 24 is executed in S502 of FIG. 12.

Firstly, the integration unit 150 selects an entry to be an integration target (S1001). A method for selecting an entry to be an integration target is not limited to a specific method. For example, the integration unit 150 can select an entry having entered a valid state most previously as an integration target entry.

Next, the integration unit 150 identifies a region corresponding to the selected entry (referred to as a target region) (S1002). The integration unit 150 can identify a target region with reference to a logical address range indicated by the selected entry.

In the third embodiment, two correspondences related to different regions are recorded in different entries. In S1002, thus, one region is identified as the target region per entry.

Next, the integration unit 150 reads the sub-table 211 of the logical address-physical address translation table 202 corresponding to the target region from the NAND memory 200 (S1003), and updates the read sub-table 211 (S1004). In other words, the integration unit 150 integrates the contents of the target entry in the read sub-table 211.

Next, the integration unit 150 writes the updated sub-table 211 to the NAND memory 200 (S1005), and completes the integration operation.

The memory controller 100 may include a cache memory in which part or the whole of the logical address-physical address translation table 202 is cached. In the case of the cache memory storing the sub-table 211 corresponding to the target region, the integration unit 150 may acquire the sub-table 211 from the cache memory in S1003.

The integration unit 150 may leave the updated sub-table 211 in the cache memory and postpone to write the updated sub-table 211 to the NAND memory 200. If the sub-table 211 stored in the cache memory is to be updated again before writing the sub-table 211 to the NAND memory 200, the integration unit 150 may acquire the sub-table 211 from the cache memory for update before writing the sub-table 211 to the NAND memory 200.

In this manner, the integration unit 150 can utilize the cache memory to lower the frequency at which the sub-table 211 is read from the NAND memory 200 (S1003), and the frequency at which the sub-table 211 is written to the NAND memory 200 (S1005).

As described above, according to the third embodiment, regarding a logical address range of non-volatilized write data across a logical address at a region boundary, the memory controller 100 records a correspondence related to the range prior to the logical address and a correspondence related to the range subsequent to the logical address in different entries.

This makes it possible to equalize the number of entries and the number of the sub-tables 211 to be read from the NAND memory 200. This eliminates the necessity for estimating the number of the sub-tables 211 to be read from the NAND memory 200.

Moreover, in the integration operation, the memory controller 100 identifies one or more sub-tables 211 corresponding to one or more entries as an integration target, and reads the identified sub-tables 211 from the NAND memory 200. The memory controller 100 then updates the read sub-tables 211, and writes the updated sub-tables 211 to the NAND memory 200.

Thereby, the same number of sub-tables 211 as the number of entries as an integration target is updated.

With the above configuration, regarding a logical address range of non-volatilized write data across a logical address corresponding to a region boundary, the non-volatilization unit 120 generates an update notification indicating a correspondence related to the range prior to the logical address and an update notification indicating a correspondence related to the range subsequent to the logical address, and sets the merge flag to OFF in the update notification indicating the correspondence related to the range subsequent to the logical address.

From the merge flag indicating OFF, the difference table management unit 140 determines that the exception condition is satisfied, and records the notified correspondence in a free entry. That is, the difference table management unit 140 can record, in different entries, a correspondence related to a range prior to a logical address corresponding to a region boundary and a correspondence related to a range subsequent to the logical address corresponding to the region boundary.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a first memory that is nonvolatile and configured to store a logical address-physical address translation table which indicates a first correspondence, the first correspondence being a correspondence between a logical address and a physical address at first timing, the logical address being location information designated by a host, the physical address being information of a location in the first memory;
   a second memory configured to store a difference table, the difference table including a plurality of entries and being configured to record, in each of the entries, a correspondence between a logical address range and a physical address range, the correspondence representing a difference between the first correspondence and a second correspondence, the second correspondence being a correspondence between the logical address and the physical address at second timing later than the first timing; and
   a controller configured to:
      non-volatilize write data requested by a write command from the host; and
      update the difference table in response to non-volatilization of the write data, wherein
      the controller is further configured to:
         in non-volatilizing first write data in a first logical address range to a first physical address range,
         in a case where the entries includes a first entry, update contents of a first entry, the first entry being an entry containing a correspondence between a second logical address range and a second physical address range, the first logical address range following the second logical address range, the first physical address range following the second physical address range; and
         in a case where the entries include no first entry, record, in a second entry, a correspondence between the first logical address range and the first physical address range, the second entry being an entry in which a new correspondence is recordable.

2. The memory system according to claim 1, wherein the correspondence to be recorded in each of the entries includes length information representing a length of the logical address range or the physical address range, and the controller is configured to update the length information recorded in the first entry to a value corresponding to either a combined range of the first logical address range and the second logical address range or a combined range of the first physical address range and the second physical address range.

3. The memory system according to claim 1, wherein the controller is further configured to determine whether a third entry corresponds to the first entry, the third entry being a previously updated entry.

4. The memory system according to claim 3, wherein the third entry contains a correspondence between a third logical address range and a third physical address range, and
the controller is configured to
   determine, on the basis of tail end information, whether the first logical address range follows the third logical address range and the first physical address range follows the third physical address range, the tail end information being information on a tail end of each of the third logical address range and the third physical address range.

5. The memory system according to claim 3, wherein a logical address space is divided into a plurality of partial spaces, and
the controller is configured to store the third entry on a partial space basis.

6. The memory system according to claim 1, wherein the controller is further configured to integrate contents of one or more of the entries in the logical address-physical address translation table, and set the one or more entries to be a ready state for recording of a new correspondence.

7. The memory system according to claim 6, wherein
the logical address-physical address translation table includes a plurality of sub-tables each corresponding to a logical address range of a given size,
the controller is further configured to:
non-volatilize second write data in a third logical address range to a third physical address range, and when the third logical address range includes a first logical address, the first logical address corresponding to a boundary between the sub-tables, record a correspondence related to a fourth logical address range and a correspondence related to a fifth logical address range in different entries,
the fourth logical address range is prior to the first logical address within the third logical address range, and
the fifth logical address range is subsequent to the first logical address within the third logical address range.

8. The memory system according to claim 7, wherein
the controller is further configured to identify one or more sub-tables corresponding to the one or more entries, read and update the identified sub-tables from the first memory, and write the updated sub-tables to the first memory.

9. A memory system comprising:
a first memory that is nonvolatile and configured to store a logical address-physical address translation table which indicates a first correspondence, the first correspondence being a correspondence between a logical address and a physical address at first timing, the logical address being location information designated by a host, the physical address being information of a location in the first memory;
a second memory configured to store a difference table, the difference table including a plurality of entries and being configured to record, in each of the entries, a correspondence between a logical address range and a physical address range, the correspondence representing a difference between the first correspondence and a second correspondence, the second correspondence being a correspondence between the logical address and the physical address at second timing later than the first timing;
a non-volatilization device configured to execute non-volatilization of write data requested by a write command from the host, and generate, in response to the non-volatilization, a notification indicating a logical address range associated with the write data and a physical address range that is a destination of the non-volatilized write data; and
a difference table management device configured to update the difference table in accordance with the notification, wherein the difference table management device is configured to:
in a case where the difference table includes a first entry, update the first entry; and
in a case where the difference table includes no first entry, record a correspondence between a first logical address range and a first physical address range in a second entry, wherein
the first logical address range is a logical address range indicated by the notification,
the first physical address range is a physical address range indicated by the notification,
the first entry contains a correspondence between a second logical address range and a second physical address range, the first logical address range following the second logical address range, the first physical address range following the second physical address range, and
the second entry is recordable of a new correspondence among the entries.

10. The memory system according to claim 9, further comprising
a third memory configured to buffer two or more items of write data requested by different write commands, wherein
the non-volatilization device is configured to non-volatilize the two or more items of write data buffered in the third memory, and generate the notification for each of the two or more items of non-volatilized write data.

11. The memory system according to claim 9, wherein
the logical address-physical address translation table includes a plurality of sub-tables each corresponding to a logical address range of a given size, and
the non-volatilization device is further configured to:
non-volatilize first write data associated with a third logical address range to a third physical address range, and
when the third logical address range includes a first logical address, the first logical address corresponding to a boundary between the logical address ranges of the given size, generate a first notification for a logical address range prior to the first logical address within the third logical address range and a second notification for a logical address range subsequent to the first logical address within the third logical address range, and
generate a request for separately setting an entry related to the first notification and an entry related to the second notification.

12. The memory system according to claim 11, wherein
the non-volatilization device is configured to set the request to the second notification.

* * * * *